(12) United States Patent
Ota et al.

(10) Patent No.: US 9,224,994 B2
(45) Date of Patent: Dec. 29, 2015

(54) ELECTRIC POWER TOOL POWERED BY BATTERY PACK AND ADAPTER THEREFOR

(75) Inventors: Tomoyuki Ota, Anjo (JP); Shinichi Hira, Anjo (JP); Tadashi Makihara, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 637 days.

(21) Appl. No.: 13/640,270

(22) PCT Filed: Mar. 15, 2011

(86) PCT No.: PCT/JP2011/056071
§ 371 (c)(1),
(2), (4) Date: Oct. 9, 2012

(87) PCT Pub. No.: WO2011/129171
PCT Pub. Date: Oct. 20, 2011

(65) Prior Publication Data
US 2013/0025893 A1 Jan. 31, 2013

(30) Foreign Application Priority Data
Apr. 12, 2010 (JP) ................................. 2010-091720

(51) Int. Cl.
*H02J 7/00* (2006.01)
*H01M 2/10* (2006.01)
*H02J 1/10* (2006.01)
*H01M 10/48* (2006.01)

(52) U.S. Cl.
CPC .......... *H01M 2/1033* (2013.01); *H01M 2/1066* (2013.01); *H01M 10/482* (2013.01); *H02J 1/10* (2013.01); *H02J 7/0045* (2013.01); *H01M 2220/30* (2013.01)

(58) Field of Classification Search
CPC ..................................................... H01M 10/482
USPC ......................................... 320/107, 112, 114
See application file for complete search history.

(56) References Cited

U.S. PATENT DOCUMENTS

| 5,028,858 | A | | 7/1991 | Schnizler et al. |
| 5,929,597 | A | * | 7/1999 | Pfeifer et al. ................. 320/107 |
| 6,087,815 | A | | 7/2000 | Pfeifer et al. |

(Continued)

FOREIGN PATENT DOCUMENTS

| DE | 10 2008 040 061 A1 | 1/2010 |
| EP | 1 128 517 A2 | 8/2001 |

(Continued)

OTHER PUBLICATIONS

Oct. 17, 2014 Supplementary European Search Report issued in European Application No. 11768692.

(Continued)

*Primary Examiner* — Richard V Muralidar
(74) *Attorney, Agent, or Firm* — Oliff PLC

(57) ABSTRACT

An adapter for an electric power tool couples battery packs with the electric power tool. The adapter is provided with a voltage regulator circuit interposed between the battery packs and the electric power tool. The voltage regulator circuit regulates a supply voltage from the battery packs to the electric power tool to a level corresponding to a rated voltage of the electric power tool. The voltage regulator is capable of raising the supply voltage higher than nominal voltages of the battery packs.

13 Claims, 27 Drawing Sheets

(56) References Cited

U.S. PATENT DOCUMENTS

| | | | |
|---|---|---|---|
| 6,104,162 A * | 8/2000 | Sainsbury et al. | 320/111 |
| 6,172,860 B1 | 1/2001 | Yoshimizu et al. | |
| 6,324,339 B1 | 11/2001 | Hudson et al. | |
| 6,502,949 B1 | 1/2003 | Horiyama et al. | |
| 8,813,866 B2 * | 8/2014 | Suzuki | B25F 5/00 173/2 |
| 8,890,468 B2 * | 11/2014 | Bauer | H01R 31/06 320/107 |
| 8,912,751 B2 * | 12/2014 | Suzuki | H01M 2/1055 320/103 |
| 8,984,711 B2 * | 3/2015 | Ota | H01M 2/10 15/339 |
| 2003/0173940 A1 | 9/2003 | Kovarik et al. | |
| 2006/0244414 A1 | 11/2006 | Lay | |
| 2008/0018303 A1 | 1/2008 | Scheucher | |
| 2008/0309289 A1 | 12/2008 | White et al. | |
| 2009/0071675 A1 | 3/2009 | Hanawa et al. | |
| 2009/0108806 A1 | 4/2009 | Takano et al. | |
| 2009/0237012 A1 | 9/2009 | Yokoyama et al. | |
| 2011/0147031 A1 | 6/2011 | Matthias et al. | |
| 2012/0262035 A1 | 10/2012 | Takano et al. | |

FOREIGN PATENT DOCUMENTS

| | | |
|---|---|---|
| EP | 1 559 511 A2 | 8/2005 |
| EP | 2 003 761 A2 | 12/2008 |
| JP | U-3-62783 | 6/1991 |
| JP | A-4-150727 | 5/1992 |
| JP | A-11-262172 | 9/1999 |
| JP | A-2000-308268 | 11/2000 |
| JP | A-2001-300867 | 10/2001 |
| JP | A-2005-278375 | 10/2005 |
| JP | A-2006-334773 | 12/2006 |
| JP | A-2007-229827 | 9/2007 |
| JP | A-2008-177138 | 7/2008 |
| WO | WO 2010/000535 A1 | 1/2010 |

OTHER PUBLICATIONS

Office Action issued in Japanese Patent Application No. 2010-091720 mailed Jan. 7, 2014 (with translation).
Office Action issued in Russian Application No. 2012147800 dated Mar. 27, 2014 (with translation).
Office Action issued in Japanese Patent Application No. 2010-091720 mailed May 13, 2014 (with translation).
Office Action issued in Chinese Patent Application No. 201180027094.6 mailed May 22, 2014 (with partial translation).
International Search Report issued in International Patent Application No. PCT/JP2011/056071 mailed Jun. 14, 2011.
International Preliminary Report on Patentability issued in International Patent Application No. PCT/JP2011/056071 mailed Nov. 6, 2012.

* cited by examiner

ELECTRIC POWER TOOL POWERED BY BATTERY PACK AND ADAPTER THEREFOR

TECHNICAL FIELD

The present teachings relate to a battery powered electric power tool.

DESCRIPTION OF RELATED ART

An electric power tool that uses a battery pack as a power supply is widely used. Normally this kind of power tool can use only a battery pack corresponding to a rated voltage thereof. For example, an electric power tool of which rated voltage is 36 V can use only a battery pack of which nominal voltage is 36 V. This means that a user who purchases a new electric power tool of which rated voltage is 36 V must also purchase a battery pack of which nominal voltage is 36 V.

With the foregoing in view, U.S. Pat. No. 5,028,858 discloses an electric power tool which uses two battery packs as a power supply. This electric power tool has two battery packs as the power supply, wherein these two battery packs are connected in series. According to this configuration, a battery pack of which nominal voltage is 18 V can be used for an electric power tool of which rated voltage is 36 V, for example. This means that a user who purchases the electric power tool of which rated voltage is 36 V need not always purchase a battery pack of which nominal voltage is 36 V, if the user already has the battery packs of which nominal voltage is 18 V.

BRIEF SUMMARY OF INVENTION

Technical Problem

According to the above mentioned electric power tool, a user who purchases a new electric power tool can effectively use already owned battery packs. However in some cases battery packs owned by the user may not be used merely by connecting two battery packs in series. For example, if a rated voltage of the electric power tool is 36 V, the electric power tool requires two battery packs of which nominal voltage is 18 V respectively. In this case, no matter how many battery packs of which nominal voltage is 14.4 V the user has, the user cannot use these battery packs for the electric power tool. The user must purchase two new battery packs of which nominal voltage is 18 V respectively.

With the foregoing in view, the present description discloses a technology to effectively use battery packs the user already has.

Solution to the Technical Problem

The present description discloses an adapter for connecting at least one battery pack with an electric power tool. This adapter comprises a battery-side unit, a tool-side unit and an electric cord. The battery-side unit is configured to attach at least one battery pack, and be electrically connected to at least one battery pack that is attached. The tool-side unit is configured to attach the electric power tool, and be electrically connected to the attached electric power tool. The battery-side unit and the tool-side unit are electrically connected via the electric cord, and the discharge power from the battery pack is sent from the battery-side unit to the tool-side unit.

The adapter further comprises a voltage regulator circuit. The voltage regulator circuit is interposed between at least one battery pack attached to the battery-side unit, and the electric power tool attached to the tool-side unit. The voltage regulator circuit can regulate a supply voltage from the battery pack to the electric power tool to a level corresponding to a rated voltage of the electric power tool, even if a nominal voltage of the battery pack is different from the rated voltage of the electric power tool.

The present description also discloses an integral type adapter that has no electric cord. This adapter has a battery interface, a tool connector and a voltage regulator circuit. A battery interface is configured to attach at least one battery pack, and be electrically connected to at least one attached battery pack. The tool connector is configured to be attach an electric power tool, and to be electrically connected to the attached electric power tool. The voltage regulator circuit is configured to be interposed between at least one battery pack attached to the battery interface and the electric power tool to which the tool connector is attached. Thereby a supply voltage from the battery pack to the electric power tool can be regulated to a level corresponding to the rated voltage of the electric power tool, even if a nominal voltage of the battery pack is different from the rated voltage of the electric power tool.

The present description also discloses an electric power tool enclosing the above mentioned configuration. This electric power tool comprises a motor configured to drive a tool, a battery interface and a voltage regulator circuit. The battery interface is configured to be attached to at least one battery pack, and to be electrically connected to at least one attached battery pack. The voltage regulator circuit is configured to be interposed between at least one battery pack attached to the battery interface and the motor. Thereby a supply voltage from the battery pack to the motor can be regulated to a level corresponding to a rated voltage of the motor, even if a nominal voltage of the battery pack is different from the rated voltage of the motor.

Here the above mentioned voltage regulator circuit can be constituted by a DC-DC converter (also called a "switching power supply"), for example. By using the DC-DC converter, the supply voltage from the battery pack to the electric power tool (that is, the motor) can be set to be higher than the nominal voltage of the battery pack, or can be set to be lower than the nominal voltage of the battery pack. The DC-DC converter here is not limited to a circuit having a specific structure, but refers widely to a circuit that steps up or steps down the DC voltage. A known example of the DC-DC converter is comprised of a coil, a switching element, a capacitor and a diode. This kind of DC-DC converter intermittently supplies current to the coil by turning the switching element ON/OFF, generating an AC voltage that steps up or steps down by an induced electromagnetic force generated in the coil, and generates the stepped up or stepped down DC voltage by rectifying the AC voltage using the capacitor and the diode.

The above mentioned voltage regulator circuit may be a circuit connecting a plurality of battery packs combining series and parallel connections. According to this circuit, all the battery packs are not connected in series, but at least a part of the plurality of battery packs are connected in parallel, whereby a supply voltage from the battery packs to the electric power tool can be regulated to a level corresponding to a rated voltage of the electric power tool (that is, a rated voltage of the motor).

DETAILED DESCRIPTION OF INVENTION

Figure 1:
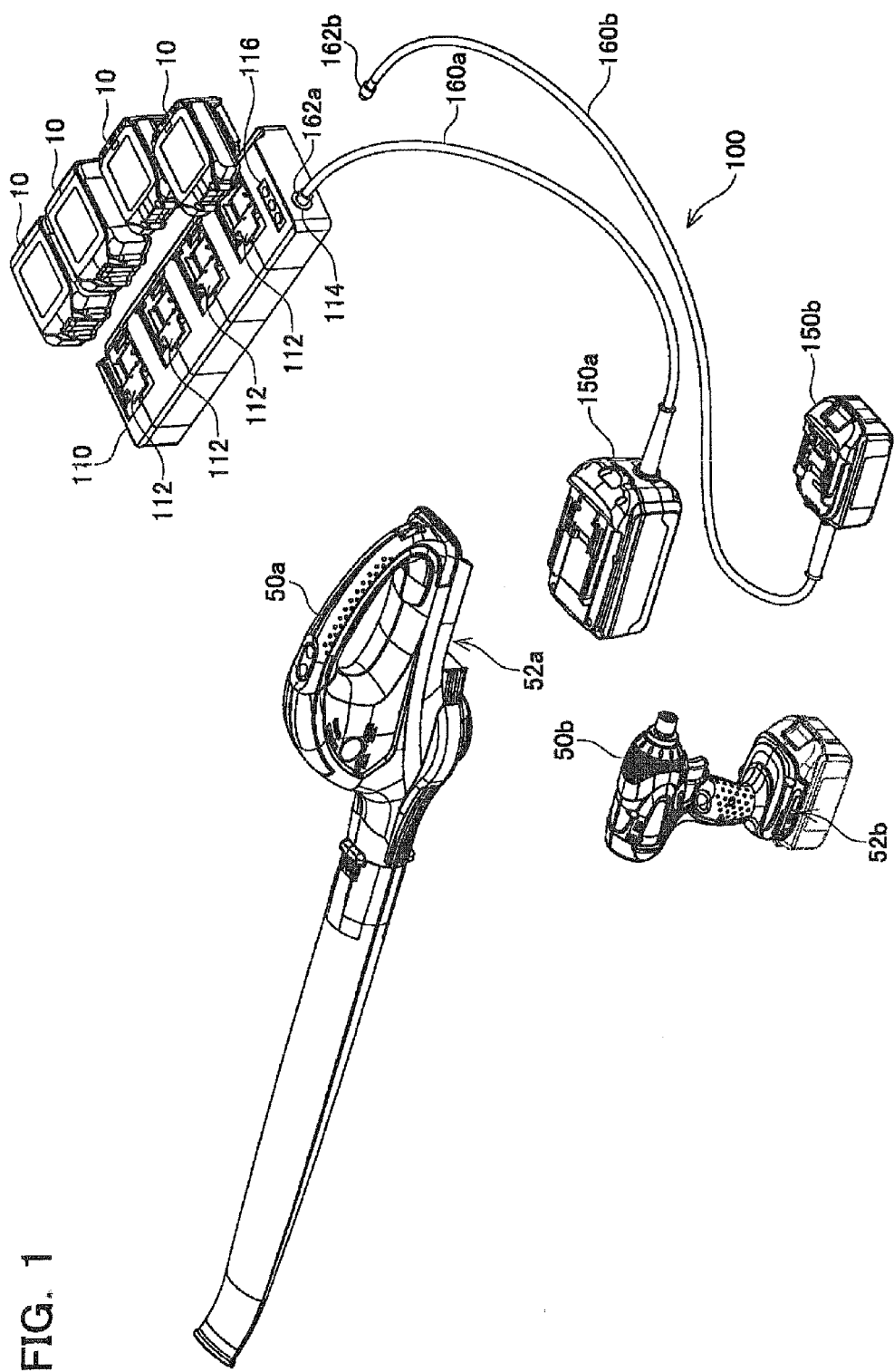
FIG. 1 is an external view of an adapter of First Embodiment.

According to an embodiment of the present invention, it is preferable that a voltage regulator circuit is provided with at least one DC-DC converter. According to this embodiment, an output voltage from a battery pack can be regulated to a level corresponding to a rated voltage of an electric power tool (that is, a rated voltage of a motor thereof) by the DC-DC converter.

According to an embodiment of the present invention, it is preferable that a voltage regulator circuit is provided with a battery connector circuit configured to electrically connect a plurality of battery packs, and a DC-DC converter configured to step-up or step-down an output voltage from the battery connector circuit. Here the battery connector circuit may be a series circuit configured to connect a plurality of battery packs in series, or a parallel circuit configured to connect a plurality of battery packs in parallel, or a series-parallel circuit configured to connect a plurality of battery packs in a combination of a series and parallel connections.

According to an embodiment of the present invention, it is preferable that a voltage regulator is provided with a battery connector circuit configured to electrically connect a plurality of DC-DC converters and a plurality of battery packs, and each battery pack is connected to the battery connector circuit via the DC-DC converter. According to this embodiment, an output voltage of each battery pack can be regulated by the corresponding DC-DC converter. Therefore even if the plurality of battery packs has a mutually different nominal voltage, the plurality of battery packs can be connected in parallel in the battery connector circuit.

According to an embodiment of the present invention, it is preferable that a voltage regulator circuit is provided with means for detecting a rated voltage of the electric power tool. In this case, it is preferable that the voltage regulator circuit is configured to regulate the supply voltage to the electric power tool (that is, the motor thereof) in at least two levels according to the detected rated voltage. According to this embodiment, a same battery pack can be used for a plurality of electric power tools having mutually different rated voltage.

In the above mentioned embodiment, it is preferable that the electric power tool is provided with storing means for storing data indicative of the rated voltage. In this case, it is preferable that the voltage regulator circuit is configured to read this data from the storing means of the electric power tool to detect the rated voltage of the electric power tool. According to this embodiment, the rated voltage of the electric power tool can be accurately detected.

According to an embodiment of the present invention, it is preferable that a voltage regulator circuit is provided with means of detecting a nominal voltage of each battery pack. In this case, it is preferable that the voltage regulator circuit is configured to change a mode of operation according to the respective nominal voltage that is detected. According to this embodiment, various battery packs having different nominal voltages can be used for an electric power tool having one rated voltage.

In the above mentioned embodiment, it is preferable that each battery pack is provided with storing means for storing data indicative of the nominal voltage. In this case, it is preferable that the voltage regulator circuit is configured to read the data from the storing means of each battery pack to detect the nominal voltage of each battery pack. According to this embodiment, the nominal voltage of each battery pack can be accurately detected.

According to an embodiment of the present invention, it is preferable that an adapter is provided with a plurality of tool-side units, which include at least a first tool-side unit and a second tool-side unit which are configured to be alternatively attachable to a battery-side unit. In this case, the first tool-side unit is configured to be attachable to an electric power tool having a first rated voltage, and not be attachable to an electric power tool having a second rated voltage. It is preferable that the second tool-side unit is configured to be attachable to the electric power tool having the second rated voltage, and to be attachable to the electric power tool having the first rated voltage. It is preferable that a voltage regulator circuit is configured to regulate the supply voltage to the electric power tool corresponding to the tool-side unit attached to the battery-side unit. In other words, the voltage regulator circuit is configured to regulate the supply voltage to a level that is substantially equal to the first rated voltage when the battery-side unit is attached to the first tool-side unit, and regulate the supply voltage to a level that is substantially equal to the second rated voltage when the battery-side unit is attached to the second tool-side unit.

According to the above mentioned embodiment, the user selectively uses a corresponding tool-side unit according to the rated voltage of the electric power tool. The adapter regulates the supply voltage to the electric power tool according to the tool-side unit to be used. As a result, a voltage according to the rated voltage is correctly supplied to the electric power tool. In other words, a voltage corresponding to the first rated voltage is supplied with certainty to the electric power tool having the first rated voltage, and a voltage corresponding to the second rated voltage is supplied with certainty to the electric power tool having the second rated voltage. According to this embodiment, the voltage regulator circuit can identify the tool-side unit to be used, and need not directly detect the rated voltage of the electric power tool. Hence, the electric power tool does not necessarily have to have the abovementioned storing means. In other words, the adapter of this embodiment can also be used as a general electric power tool that does not have storing means.

In the above mentioned embodiment, it is preferable that each tool-side unit is provided with storing means configured to store data by which identification can be made from the other tool-side units. In this case, the voltage regulator circuit is configured to read the data from the storing means of the tool-side unit to identify the tool-side unit attached to the battery-side unit. According to this embodiment, the tool-side unit to be used can be identified with certainty.

According to an embodiment of the present invention, it is preferable that an adapter is provided with a plurality of tool-side units including at least a first tool-side unit and a second tool-side unit, and a plurality of electric cords including a first electric cord having a tip end coupled with the first-tool side unit and a second electric cord having a tip end coupled with the second tool-side unit. It is preferable that a battery-side unit is provided with a first cord connection for connecting a base end of the first electric cord and a second cord connection for connecting a base end of the second electric cord.

In the above mentioned embodiment, it is preferable that the first tool-side unit is configured to be attachable to an electric power tool having a first rated voltage, and not attachable to an electric power tool having a second rated voltage. It is preferable that the second tool-side unit is configured to be attachable to the electric power tool having the second rated voltage, and not attachable to the electric power tool having the first rated voltage. It is preferable that the base ends of the first and second electric cords have shapes different from one another. Thereby the first cord connection can be configured to accept the base end of the first electric cord, and not accept the base end of the second electric cord; the second cord connection can be configured to accept the base end of the second electric cord, and not accept the base end of the first electric cord. It is preferable that the voltage regulator circuit is configured to output a voltage regulated to a level that is substantially equal to the first rated voltage from the first cord connection, and output a voltage regulated to a level that is substantially equal to the second rated voltage from the second cord connection.

According to the above mentioned embodiment, the user can selectively use the tool-side unit corresponding to the rated voltage of the electric power tool. The user can also connect the electric cord of the selected tool-side unit to only a corresponding cord connection of the battery-side unit. The battery-side unit outputs only the corresponding voltage from the respective cord connection. As a result, the voltage corresponding to the rated voltage is correctly supplied to the electric power tool. In other words, the voltage corresponding to the first rated voltage is supplied with certainty to the electric power tool having the first rated voltage via the first cord connection, and the voltage corresponding to the second rated voltage is supplied with certainty to the electric power tool having the second rated voltage via the second cord connection. According to this embodiment, the voltage regulator circuit need not detect a rated voltage of an electric power tool, or identify a tool-side unit to be used. Therefore the configuration of the voltage regulator circuit can be simplified.

According to an embodiment of the present invention, it is preferable that a voltage regulator circuit is provided with means for detecting a number of battery packs attached to the battery-side unit. In this case, it is preferable that the voltage regulator circuit is configured to change a mode of operation according to the detected number of battery packs. According to this embodiment, the voltage corresponding to the rated voltage can be correctly supplied to the electric power tool regardless of the number of battery packs to be used.

According to an embodiment of the present invention, an adapter may be provided with a battery connector circuit, instead of the voltage regulator circuit. In this case, the battery connector is configured to be interposed between a plurality of battery packs and an electric power tool (that is, a motor thereof), and connected to at least some of the plurality of battery packs in parallel. Thereby a supply voltage from the plurality of battery packs to the electric power tool can be regulated to the level corresponding to the rated voltage of the electric power tool, even if the nominal voltage of each battery pack is different from the rated voltage of the electric power tool.

In the above mentioned embodiment, a nominal voltage of each battery pack may be the same as the rated voltage of the electric power tool. In this case, the battery connector circuit can be configured to connect all the battery packs attached to the battery-side unit in parallel. Thereby the user can continuously use the electric power tool for a long time using the already owned plurality of battery packs. Conventionally, the user must purchase a new large capacity battery pack in order to use the electric power tool for a long period of time. Whereas according to this embodiment, the user can continuously use the electric power tool for a long period of time without purchasing the new large capacity battery pack.

As mentioned above, for an adapter or an electric power tool according to an embodiment, a battery connector circuit may be configured to connect all the battery packs in parallel. In this case, it is preferable that the battery-side unit (or battery interface) is configured to be attachable to a battery pack having a nominal voltage equal to a rated voltage of the electrical power tool (that is, a rated voltage of a motor thereof), and to be not attachable to a battery pack having another nominal voltage. According to this structure, parallel connection of battery packs having mutually different nominal voltages can be prevented. Furthermore, a voltage different from the rated voltage of the electric power tool being supplied to the electric power tool can be prevented.

According to an embodiment of the present invention, it is preferable that an adapter is provided with a plurality of battery interfaces. In this case, a voltage regulator circuit or a battery connector circuit is provided with at least one switching element that is configured to electrically connect battery interfaces, that have received battery packs, to one another, and disconnect a battery interface that has not received a battery pack from the battery interfaces that have received battery packs. According to this embodiment, it can be prevented that voltage from the battery pack, attached to the battery interface, is unnecessarily applied to a terminal exposed in another battery interface that has not received a battery pack.

First Embodiment

Figure 2:
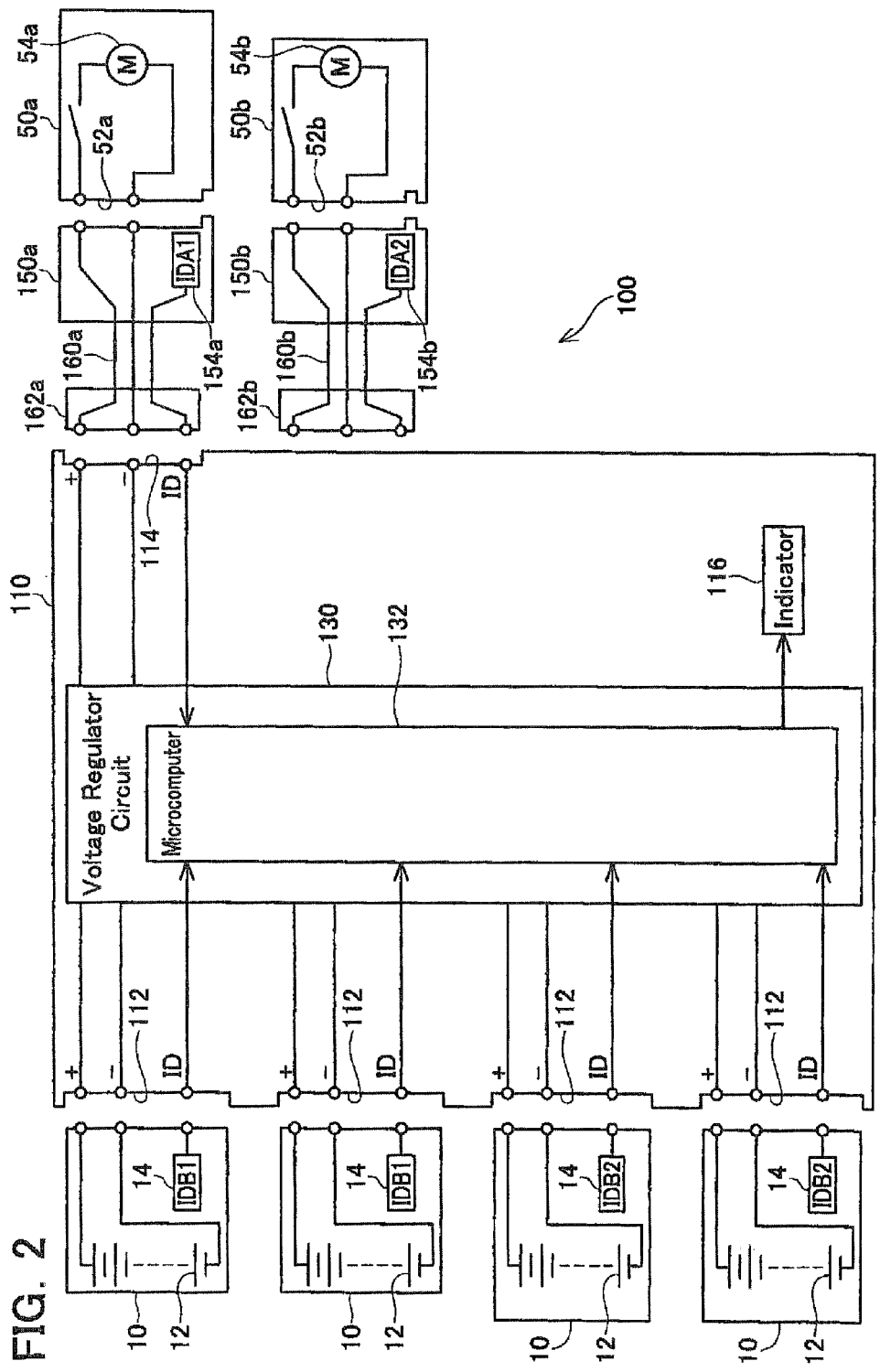
FIG. 2 is a schematic diagram depicting a circuit structure of the adapter of First Embodiment.

An adapter 100 of First Embodiment will now be described with reference to the drawings. FIG. 1 is an external view of the adapter 100, and FIG. 2 is a schematic diagram of a circuit structure of the adapter 100. As FIG. 1 and FIG. 2 illustrate, the adapter 100 is an apparatus configured to alternatively connect a maximum of four battery packs 10 to a first electric power tool 50a or a second electric power tool 50b. The adapter 100 is provided with a battery-side unit 110, a first tool-side unit 150a and a second tool-side unit 150b.

The battery-side unit 110 has four battery interfaces 112. Each battery interface 112 removably receives one battery pack 10. This means that the maximum of four battery packs 10 can be attached to the battery-side unit 110. Each battery interface 112 mechanically and electrically connects the attached battery pack 10.

Each battery pack 10 is a battery pack for a standard electric power tool, and is normally used by itself as a power supply for a corresponding electric power tool. As FIG. 2 illustrates, each battery pack 10 is provided with a plurality of battery cells 12 and a storage device 14. The battery cell 12 is a lithium ion cell, for example. The storage device 14 stores various data including product information of the battery pack 10. The product information of the battery pack 10 is determined for each product type of battery pack, and a nominal voltage and a charge capacity of the battery pack 10 can be specified based on this product information.

Each battery interface 112 can receive a battery pack 10 having various nominal voltages not limited to a specific nominal voltage. For example, according to the adapter 100 of this example, each battery interface 112 can alternatively receive a battery pack 10 of which nominal voltage is 14.4 V and a battery pack 10 of which nominal voltage is 18 V. Therefore the battery-side unit 110 can attach four battery packs 10 of which nominal voltages are the same, or four battery packs 10 of which nominal voltages are different from one another. In the example in FIG. 1, two battery packs 10 of which nominal voltages are 14.4 V and two battery packs 10 of which nominal voltages are 18 V are attached to the battery-side unit 110.

Further, the battery-side unit 110 need not always have four battery packs 10 attached, but can attach at least one battery pack 10. The user can attach one or a plurality of battery packs 10 which he/she owns to the battery-side unit 110, regardless of the nominal voltages thereof. If a shape of a battery pack 10 does not interfit with the battery interface 112, a relay adapter, to be inserted therebetween, may be provided.

The battery-side unit 110 is provided with an output port 114 and an indicator 116. The output port 114 outputs discharge power from the battery pack 10. The indicator 116 indicates an output voltage outputted from the output port 114. The battery-side unit 110 encloses a voltage regulator circuit 130 (see FIG. 2), which can regulate the output voltage outputted from the output port 114 with respect to the output voltage (nominal voltage) of the battery pack 10. The voltage regulator circuit 130 will be described in detail later.

The first tool-side unit 150a has a structure to be attachable to a battery interface 52a of the first electric power tool 50a, and to not be attachable to a battery interface 52b of the second electric power tool 50b. The second tool-side unit 150b, on the other hand, has a structure to be attachable to the battery interface 52b of the second electric power tool 50b, and to not be attachable to the battery interface 52a of the first electric power tool 50a. Therefore the user always uses the first tool-side unit 150a if the first electric power tool 50a is used, and always uses the second tool-side unit 150b if the second electric power tool 50b is used.

The first tool-side unit 150a has a first electric cord 160a, and is connected to the output port 114 of the battery-side unit 110 via the first electric cord 160a. If the first tool-side unit 150a is connected to the output port 114, the first electric power tool 50a is electrically connected to the battery-side unit 110 via the first tool-side unit 150a. Thereby the first electric power tool 50a can receive power supplied from the battery pack 10 attached to the battery-side unit 110. In the same manner, the second tool-side unit 150b has a second electric cord 160b, and is connected to the output port 114 of the battery-side unit 110 via the second electric cord 160b. If the second tool-side unit 150b is connected to the output port 114, the second electric power tool 50b is electrically connected to the battery-side unit 110 via the second tool-side unit 150b. Thereby the second electric power tool 50b can receive power supplied from the battery pack 10 attached to the battery side unit 110.

Each electric cord 160a and 160b has a plug 162a or 162b conforming to the output port 114 at a base end thereof. The battery-side unit 110 is provided with only one output port 114. Therefore only one of the first tool-side unit 150a and the second tool-side unit 150b can be alternatively connected to the battery-side unit 110. Hence if the user uses the first electric power tool 50a, only the first tool-side unit 150a is connected to the battery-side unit 110, and if the user uses the second electric power tool 50b, only the second tool-side unit 150b is connected to the battery-side unit 110.

The first electric power tool 50a and the second electric power tool 50b are cordless type electric power tools normally found on the market. Normally battery packs corresponding to the batter interfaces 52a and 52b are attached to the first electric power tool 50a and the second electric power tool 50b respectively, the first electric power tool 50a and the second electric power tool 50b operate using these power packs as power supplies. For example, the first electric power tool 50a is an electric power tool of which rated voltage is 36 V, for which a battery pack of nominal voltage is 36 V is normally used. The second electric power tool 50b, on the other hand, is an electric power tool of which rated voltage is 18 V, for which a battery pack of which nominal voltage is 18 V is normally used. However, according to the adapter 100 of this example, the first electric power tool 50a, of which rated voltage is 36 V, can be operated using battery packs 10 of which nominal voltages are 14.4 V and 18 V, even if the battery pack of which nominal voltage is 36 V is not available. Further, the second electric power tool 50b, of which rated voltage is 18 V, can be operated using only battery packs 10 of which nominal voltages are 14.4 V. The rated voltage of an electric power tool is normally determined by the rated voltage of an enclosed motor. In other words, the first electric power tool 50a encloses a motor 54a of which rated voltage is 36 V, and the second electric power tool 50b encloses a motor 54b of which rated voltage is 18 V (see FIG. 2).

The first electric power tool 50a illustrated in the drawings is an electric blower where a fan is driven by the motor 54a, and the electric blower is an example of an electric power tool. The first electric power tool 50a in this description is not limited to an electric blower. The second electric power tool 50b illustrated in the drawings is an electric screw driver of which tool bit is driven by the motor 54*b*, and the electric screw driver is also an example of an electric power tool. The second electric power tool 50*b* in this description is not limited to an electric screw driver. The rated voltage of the first electric power tool 50*a* is not limited to 36 V, and the rated voltage of the second electric power tool 50*b* is not limited to 18 V either. These values of the rated voltages are only examples to indicate that the rated voltage of the first electric power tool 50*a* is higher than the rated voltage of the second electric power tool 50*b*.

The first tool-side unit 150*a* and the second tool-side unit 150*b* have the storage device 154*a* and the storage device 154*b* respectively. In each tool-side unit 150*a* or 150*b*, the storage device 154*a* or 154*b* stores product information of the tool-side unit 150*a* or 150*b* respectively. In other words, the storage device 154*a* of the first tool-side unit 150*a* stores the product information of the first tool-side unit 150*a*, and the storage device 154*b* of the second tool-side unit 150*b* stores the product information of the second tool-side unit 150*b*. The product information of the first tool-side unit 150*a* and that of the second tool-side unit 150*b* are different from one another, and the product information is an example of information of which the first tool-side unit 150*a* and the second tool-side unit 150*b* can be identified.

As FIG. 2 illustrates, in the battery-side unit 110, four battery interfaces 112 are electrically connected to the output port 114 via the voltage regulator circuit 130. Therefore the power from the battery pack 10 is outputted from the output port 114 via the voltage regulator circuit 130. The voltage regulator circuit 130 is a circuit to transform DC voltage. The voltage regulator circuit 130 can transform the output voltage outputted from the output port 114 to be higher or lower than the output voltage (nominal voltage) of the battery pack 10. In other words, the voltage regulator circuit 130 can regulate the supply voltage from the battery pack 10 to the electric power tool 50*a* or 50*b* on at least two levels.

The voltage regulator circuit 130 is provided with a microcomputer 132, and the microcomputer 132 controls the operation of the voltage regulator circuit 130. If the first tool-side unit 150*a* or the second tool-side unit 150*b* is attached to the output port 114, the microcomputer 132 is electrically connected to the storage device 154*a* or 154*b* of the attached tool-side unit 150*a* or 150*b*. The microcomputer 132 accesses the connected storage device 154*a* or 154*b*, and reads the product information stored therein. As a result, the microcomputer 132 can identify which of the tool-side units 150*a* and 150*b* is atttached to the battery-side unit 110. Then the microcomputer 132 determines a target value of the output voltage outputted from the output port 114 according to the tool-side unit 150*a* or 150*b* connected to the battery-side unit 110. In other words, if the first tool-side unit 150*a* is connected to the battery-side unit 110, the microcomputer 132 sets the target value of the output voltage outputted from the output port 114 to a level corresponding to the rated voltage of the first electric power tool 50*a* (that is, 36 V). If the second tool-side unit 150*b* is connected to the battery-side unit 110, on the other hand, [the microcomputer 132] sets the target value of the output voltage outputted from the output port 114 to a level corresponding to the rated voltage of the second electric power tool 50*b* (that is, 18 V). Thereby whichever electric power tool 50*a* or 50*b* the user uses, the supply voltage from the battery pack 10 to the electric power tool 50*a* or 50*b* can be regulated to a level corresponding to the rated voltage of the electric power tool 50*a* or 50*b*.

Furthermore, if the battery pack 10 is attached to the battery interface 112, the microcomputer 132 is electrically connected to the storage device 14 of the battery pack 10. The microcomputer 132 accesses the storage device 14 of the battery pack 10, and reads the product information stored therein. As a result, the microcomputer 132 can detect a nominal voltage of the attached battery pack 10. By accessing the storage device 14 of the battery pack 10, the microcomputer 132 can also detect a number of battery packs 10 attached to the battery-side unit 110. The microcomputer 132 switches a mode of operation of the voltage regulator circuit 130 according to the detected number of battery packs 10 and the respective nominal voltages thereof. Thereby the supply voltage from the battery packs 10 to the electric power tool 50*a* or 50*b* can be regulated to a level corresponding to the rated voltage of the electric power tool 50*a* or 50*b*, regardless of the number of battery packs 10 attached to the battery-side unit 110 and the nominal voltages thereof.

As described above, the adapter 100 of this example is provided with the voltage regulator circuit 130, whereby the supply voltage to the electric power tool 50*a* or 50*b* can be transformed corresponding to the nominal voltage of the battery pack 10. As a result, a voltage corresponding to the rated voltage can be supplied to the electric power tool 50*a* or 50*b* to be used by the user, regardless of the nominal voltages of the battery packs 10. Therefore the user can use the first electric power tool 50*a* of which rated voltage is 36 V using battery packs 10 of which nominal voltages are 14.4 V and 18 V. According to this adapter 100, the user need not always prepare a battery pack of which nominal voltage is 36 V to use the first electric power tool 50*a*. Recently the power of electric tools is increasing, and the rated voltages thereof are becoming higher accordingly. For such an electric power tool that requires higher voltage, the user can effectively use already owned low voltage battery packs 10, without purchasing a new high voltage battery pack.

Figure 3:
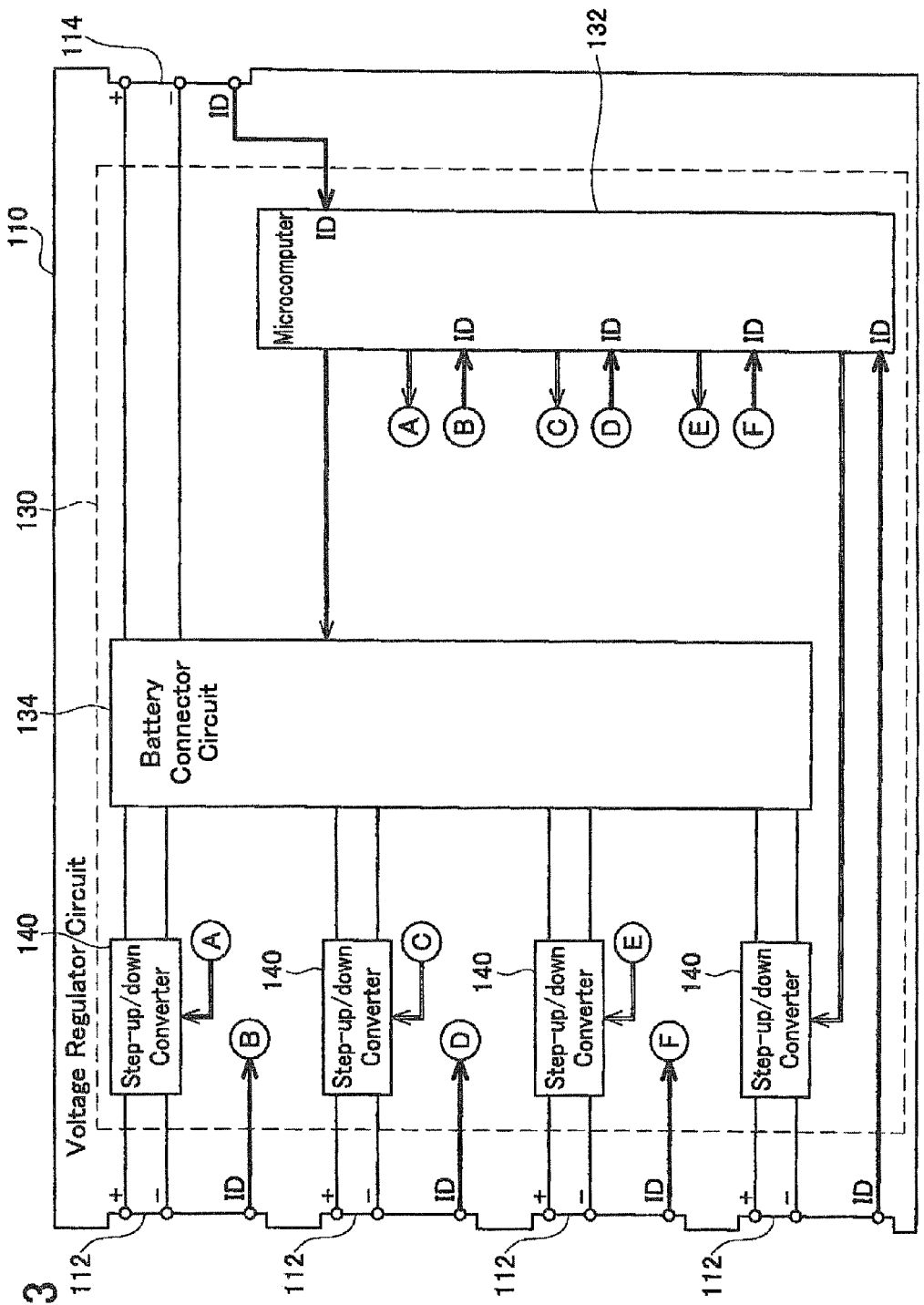
FIG. 3 illustrates an example of a voltage regulator circuit of First Embodiment.

The configurations, functions and applications of the adapter 100 have been described. An example of the internal configuration of voltage regulator circuit 130 will now be described with reference to FIG. 3 and FIG. 4. As FIG. 3 illustrates, the voltage regulator circuit 130 is provided with the microcomputer 132, a battery connector circuit 134 and four step-up/down converters 140. The battery connector circuit 134 electrically connects the four battery interfaces 112 and the output ports 114. The four step-up/down converters 140 are disposed between the four battery interfaces 112 and the batter connector circuit 134.

Each step-up/down converter 140 is a DC-DC converter, and can transform the output voltage of the battery pack 10. Each step-up/down converter 140 is controlled by the microcomputer 132. The microcomputer 132 controls each step-up/down converter 140 according to the detected nominal voltage of the battery pack 10. Thereby the voltage regulator circuit 130 can regulate the output voltage outputted from the output port 114, that is, the supply voltage to the electric power tool 50*a* or 50*b*.

Figure 4:
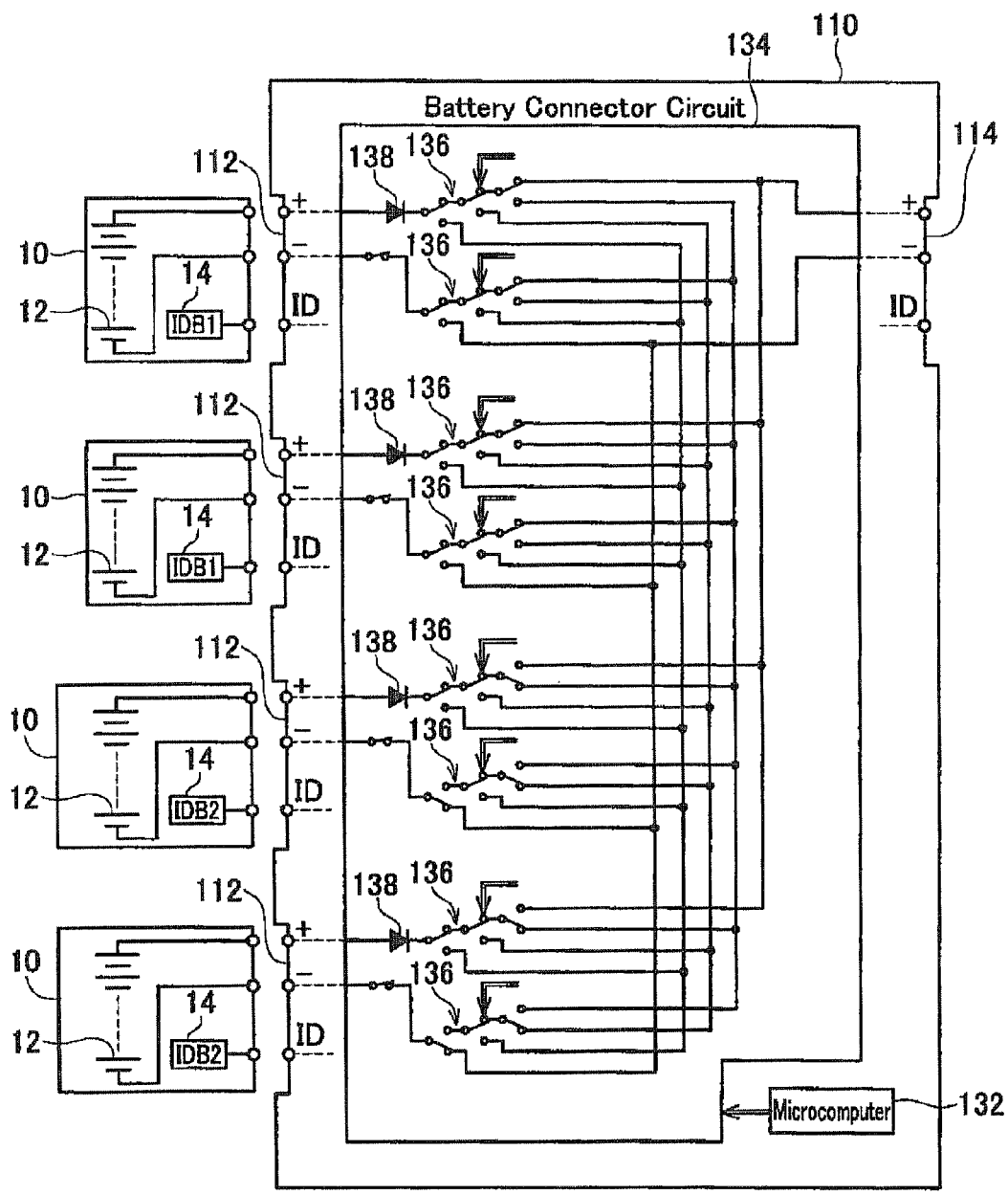
FIG. 4 illustrates an example of a battery connector circuit of First Embodiment.

As FIG. 4 illustrates, the battery connector circuit 134 has a plurality of switching elements 136 and a diode 138 for each battery interface 112. By selectively changing the plurality of switching elements 136, the battery connector circuit 134 can connect the four battery interfaces 112 in series, or connect the four battery interfaces 112 in parallel, or connect the four battery interfaces 112 in a combination of a series and parallel connections. The plurality of switching elements 136 is controlled by the microcomputer 132. The voltage regulator circuit 130 can also regulate the output voltage outputted from the output port 114, that is, the supply voltage to the electric power tool 50*a* or 50*b*, by changing the mode of connection in the battery connector circuit 134.

The battery connector circuit 134 can also electrically disconnect each battery interface 112 from the other battery interfaces 112 by selectively changing the plurality of switching elements 136. Thereby, the battery connector circuit 134 can electrically interconnect only the battery interfaces 112 that have received battery packs 10, and electrically connect those battery interfaces 112 to the output port 114. Therefore regardless of the number of battery packs 10 attached to the battery-side unit 110, power can be supplied from the battery packs 10 to the electric power tool 50a or 50b. Furthermore, the battery connector circuit 134 can electrically disconnect a battery interface 112 that has not received a battery pack 10 from the battery interfaces 112 that have received the battery packs 10. Thereby it is prevented that applying voltage from a battery pack 10 is applied to a terminal exposed in a battery interface 112 that has not received a battery pack 10.

Here an example of voltage regulation by the voltage regulator circuit 130 is shown. For example, it is assumed that a user uses the first electric power tool 50a of which rated voltage is 36 V, and two battery packs 10 of which nominal voltages are 14.4 V (hereafter called "14.4 V battery packs 10"), and two battery packs 10 of which nominal voltages are 18 V (hereafter called "18 V battery packs 10"), are attached to the battery-side unit 110. In this case, the two a step-up/down converters 140 step-up the output voltage of the two 14.4 V battery packs 10 to 18 V respectively. The step-up/down converter 140 does not transform the 18 V battery packs 10. In the battery connector circuit 134, the two 14.4V battery packs 10 are connected in parallel, and the two 18 V battery packs 10 are connected in parallel. The pair of 14.4 V battery packs 10 connected in parallel and the pair of 18 V battery packs 10 connected in parallel are interconnected in series. Since the output voltages of the 14.4 V battery packs 10 have been stepped up to 18 V, the four battery packs 10 can collectively output 36 V. In other words, 36 V voltage, corresponding to the rated voltage, is supplied to the first electric power tool 50a. If all the battery packs 10 are interconnected in parallel in the battery connector circuit 134, the four battery packs 10 collectively output 18 V.

As described above, the voltage regulator circuit 130 of this example can regulate the supply voltage from the battery packs 10 to the electric power tool 50a or 50b by a combination of the battery connector circuit 134 and the plurality of step-up/down converters 140. The voltage regulator circuit 130, however, can also regulate the supply voltage to the electric power tool 50a or 50b merely by the battery connector circuit 134 changing the mode of connection, without performing transformation using the step-up/down converter 140. In this case, the voltage regulator circuit 130 does not really need the step-up/down converter 140. Conversely, the voltage regulator circuit 130 may regulate the supply voltage to the electric power tool 50a or 50b using only the step-up/down converter 140, without the battery connector circuit 134 changing the mode of connection. In this case, the voltage regulator circuit 130 does not really need the battery connector circuit 134 which can change the mode of connection.

Figure 5:
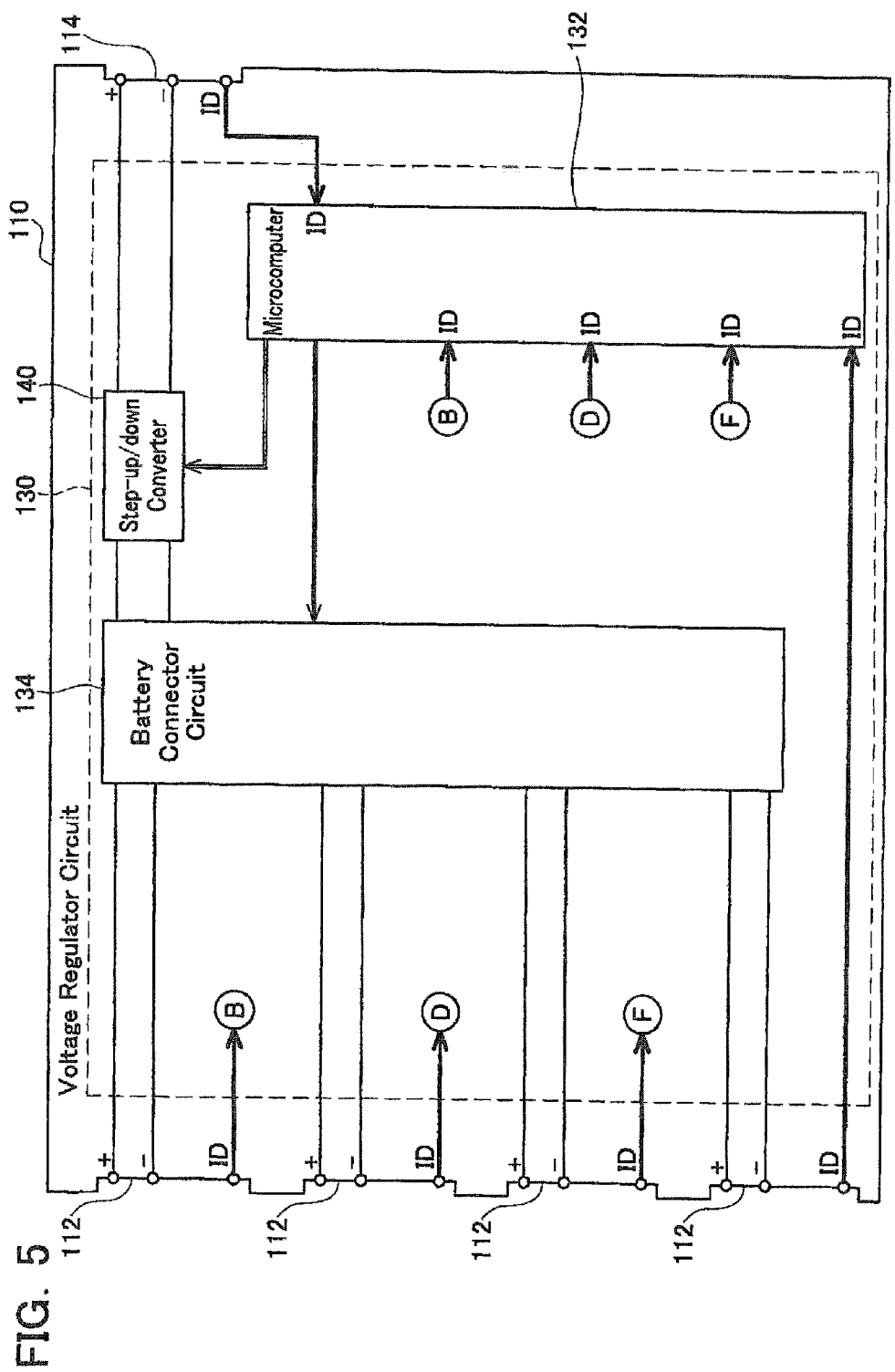
FIG. 5 illustrates another example of a voltage regulator circuit.

FIG. 5 illustrates another example of the voltage regulator circuit 130. In this voltage regulator circuit 130, one step-up/down converter 140 is disposed between the battery connector circuit 134 and the output port 114. In this voltage regulator circuit 130, one or a plurality of battery packs 10 attached to the battery-side unit 110 is electrically connected by the battery connector circuit 134, and the total output voltage of all the battery packs 10 is transformed by the step-up/down converter 140. By this configuration of the voltage regulator circuit 130 as well, the supply voltage to the electric power tool 50a or 50b can be regulated to a level corresponding to the rated voltage thereof. It is preferable that the battery packs 10, of which nominal voltages are different from one another, cannot be connected in parallel in the battery connector circuit 134.

Figure 6:
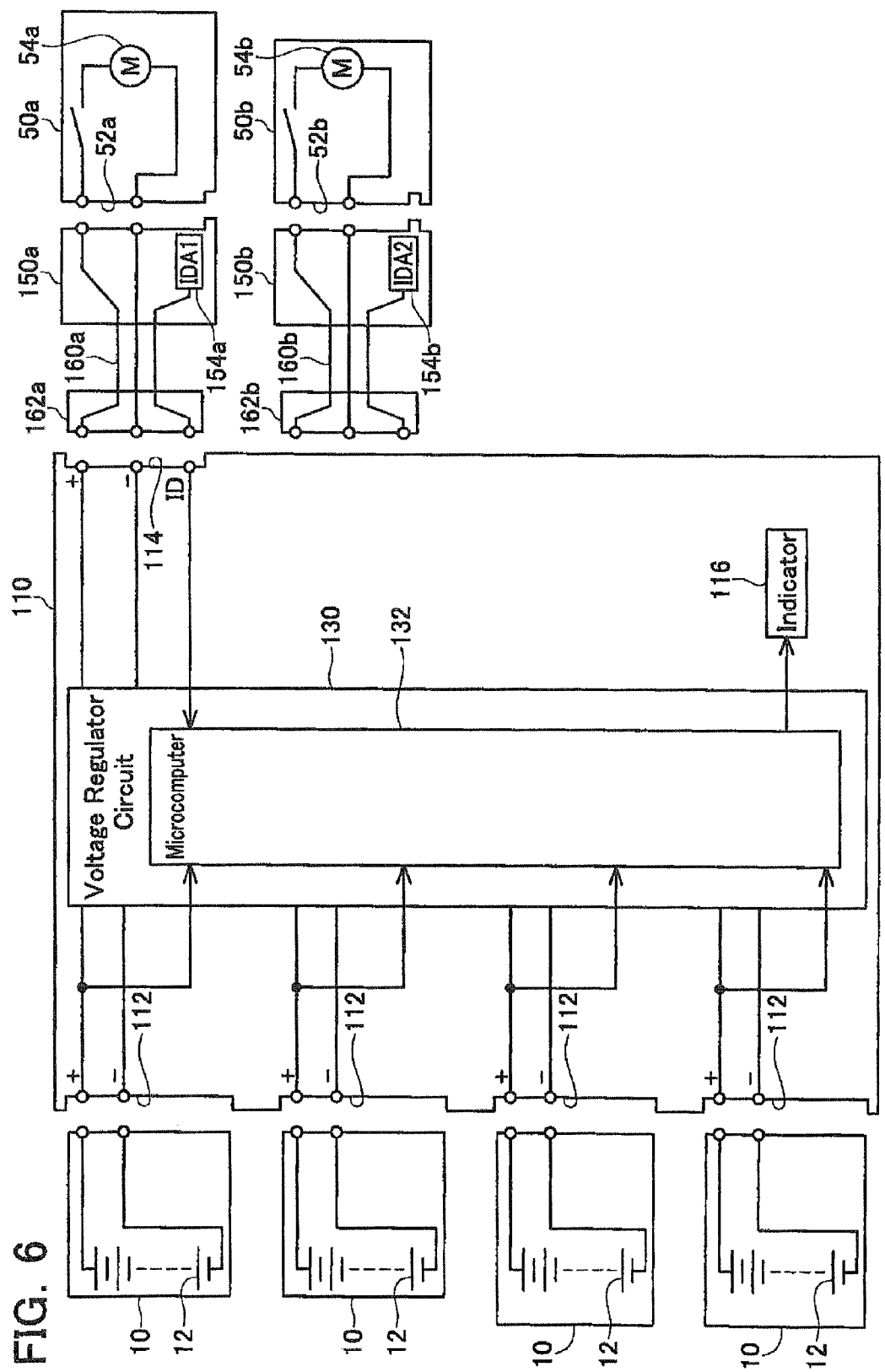
FIG. 6 illustrates a modification of the circuit structure of the adapter of First Embodiment.

FIG. 6 shows a modification of the adapter 100. As FIG. 6 illustrates, many battery packs 10 generally sold on the market do not enclose the storage device 14. In such a case, the microcomputer 132 may directly detect the output voltage of each battery pack 10. Thereby the mode of operation of the voltage regulator circuit 130 can be changed according to the output voltage (nominal voltage) of the battery pack 10.

Figure 7:
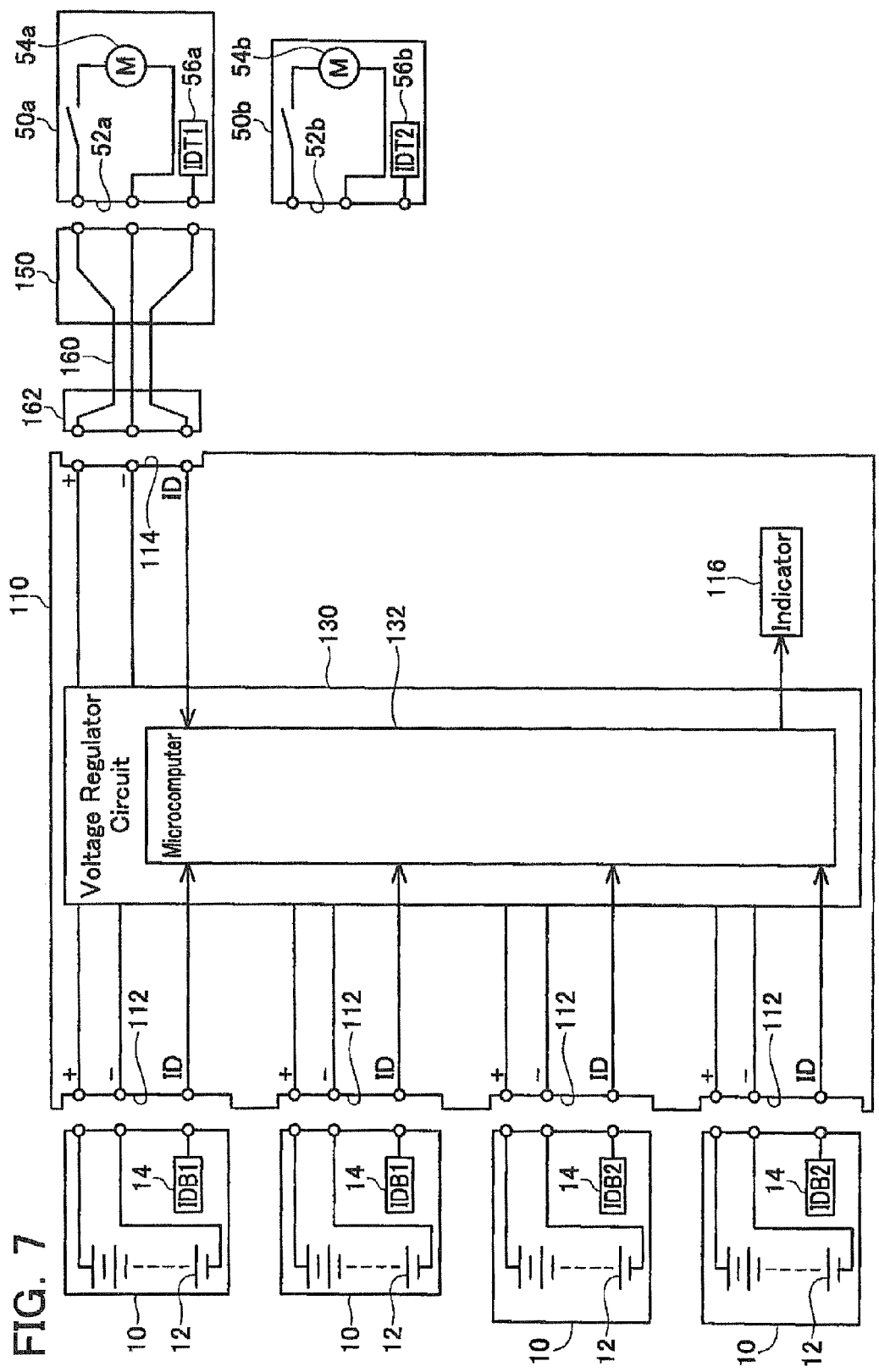
FIG. 7 illustrates a modification of the circuit structure of the adapter of First Embodiment.

FIG. 7 shows a modification of the circuit structure of the adapter 100. As FIG. 7 illustrates, the first electric power tool 50a and the second electric power tool 50b enclose the storage devices 56a and 56b respectively, where data to specify the rated voltage or data that can specify the rated voltage, such as product information, is stored respectively. In such a case, the microcomputer 132 may access the storage device 56a or 56b of the electric power tool 50a or 50b and read the stored information, so as to detect a rated voltage of the electric power tool 50a or 50b to be used. In this case, one tool-side unit 160 can be shared for the first electric power tool 50a and the second electric power tool 50b, and it is unnecessary to install the storage device 156a or 156b (see FIG. 2) in the tool-side unit 160.

The above mentioned adapter 100 of this example can be used for the battery packs 10 having various nominal voltages (14.4 V and 18 V) and the electric power tools 50a and 50b having various rated voltages (18 V and 36 V). However, the adapter 100 may allow using only a battery pack 10 having a specified nominal voltage (e.g. 18 V) and only an electric power tool having a specified rated voltage (e.g. 36V). In such a mode as well, the user can effectively use already owned low voltage battery packs 10 for a high voltage electric power tool, without purchasing a new high voltage battery pack.

Second Embodiment

Figure 8:
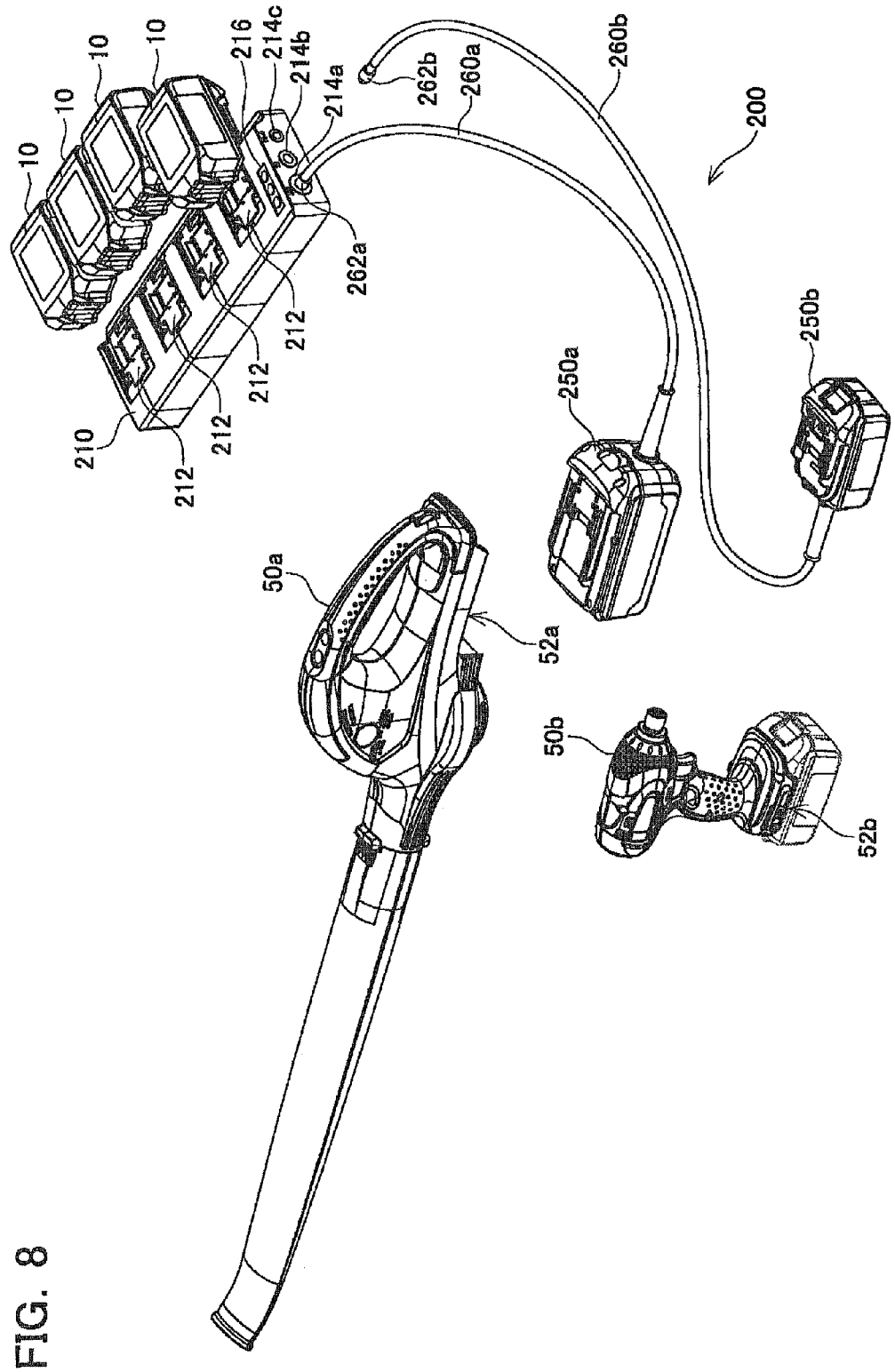
FIG. 8 is an external view of an adapter of Second Embodiment.
Figure 9:
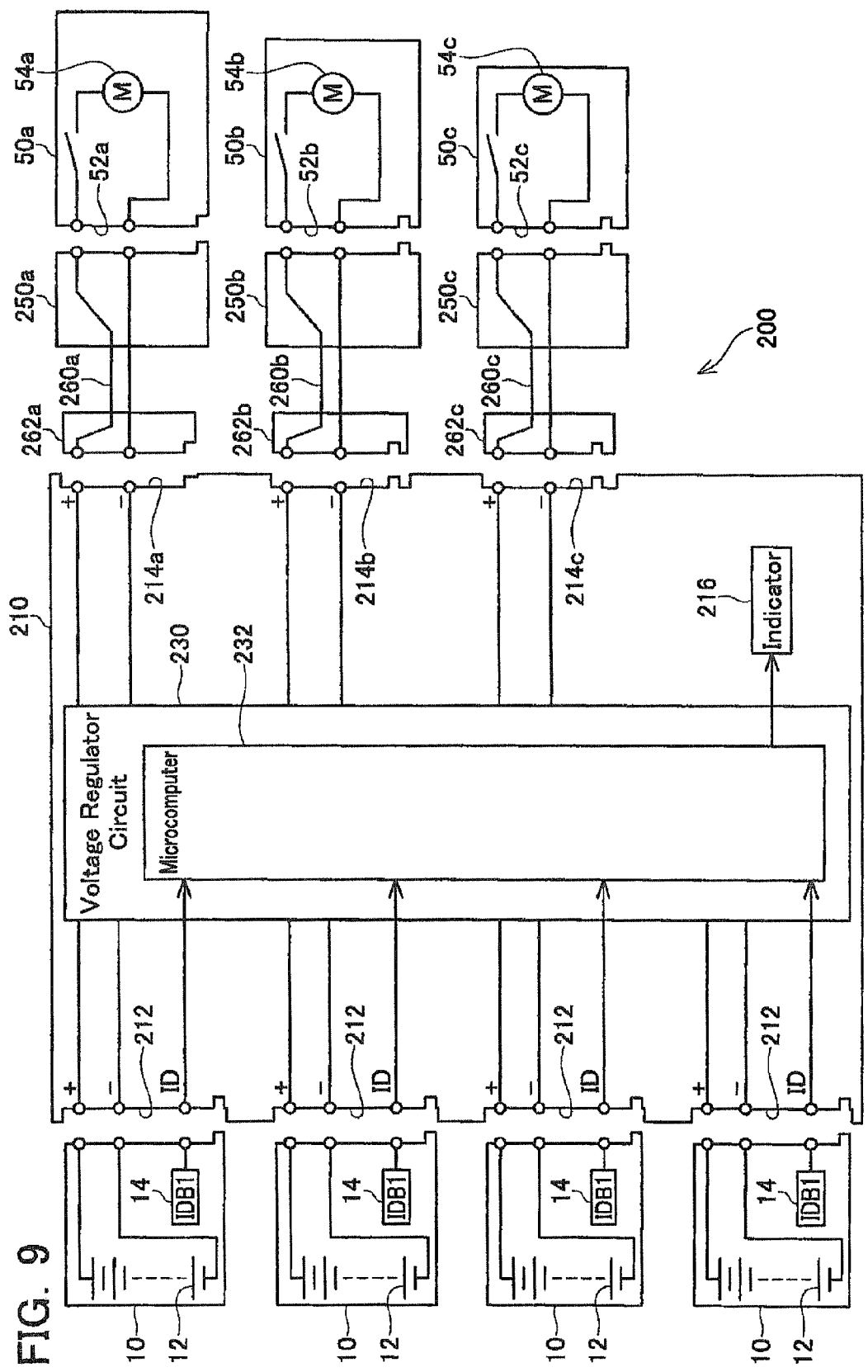
FIG. 9 is a schematic diagram depicting a circuit structure of the adapter of Second Embodiment.

An adapter 200 of Second Embodiment will now be described with reference to the drawings. FIG. 8 is an external view of the adapter 200, and FIG. 9 is a schematic diagram of a circuit structure of the adapter 200. As FIG. 8 and FIG. 9 illustrate, the adapter 200 is an apparatus configured to alternatively connect a maximum of four battery packs 10 to one of a first electric power tool 50a, a second electric power tool 50b and a third electric power tool 50c. In FIG. 9, the third electric power tool 50c and a third tool-side unit 250c are omitted. The adapter 200 is provided with a battery-side unit 210, a first tool-side unit 250a, a second tool-side unit 250b and a third tool-side unit 250c.

The battery-side unit 210 has four battery interfaces 212. Each battery interface 212 removably receives one battery pack 10. This means that a maximum of four battery packs 10 can be attached to the battery-side unit 210. Each battery interface 212 mechanically and electrically connects the attached battery pack 10. Each battery pack 10 is the same as that described in First Embodiment, and encloses the plurality of battery cells 12 and the storage device 14.

Each battery interface 212 can alternatively receive a battery pack 10 of which nominal voltage is 14.4 V and a battery pack 10 of which nominal voltage is 18 V, just like the battery interface 112 described in First Embodiment. In the example in FIG. 8 and FIG. 9, four battery packs 10 of which nominal voltages are 18 V are attached to the battery-side unit 210. Four battery packs 10 need not always be attached to the battery-side unit 210, but at least one battery pack 10 can be attached.

The battery-side unit 210 is provided with a first output port 214a, a second output port 214b, a third output port 214c and an indicator 216. In the battery-side unit 210, a discharge power by the battery pack 10 is alternatively outputted from one of the three output ports 214a to 214c. The battery-side unit 210 encloses a voltage regulator circuit 230, and can output a 36 V voltage from the first output port 214a, an 18 V voltage from the second output port 214b, and a 14.4 V voltage from the third output port 214c, regardless of the output voltage (nominal voltage) of the battery pack 10. The indicator 216 indicates one of the output ports 214a to 214c from which the voltage is outputted, in other words, indicates a type of voltage that is outputted. The voltage regulator circuit 230 will be described in detail later.

The first tool-side unit 250a is designed exclusively for the first electric power tool 50a. Therefore the first tool-side unit 250a is configured to be removably attached to the battery interface 52a of the first electric power tool 50a, but not to be attached to the battery interface 52b of the second electric power tool 50b and the battery interface 52c of the third electric power tool 50c. Here the first electric power tool 50a encloses a motor 54a of which rated voltage is 36 V, and the rated voltage of the first electric power tool 50a is also predetermined to be 36 V. The first tool-side unit 250a has a first electric cord 260a, so as to be connected to the first output port 214a of the battery-side unit 210 via the first electric cord 260a. The first electric cord 260a has a plug 262a at the base end thereof, that interfits only with the first output port 214a. In other words, the plug 262a of the first electric cord 260a does not interfit with the second output port 214b and the third output port 214c. Because of this configuration, the first electric power tool 50a of which rated voltage is 36 V can always be connected to the first output port 214a of which output voltage is 36 V, and cannot be connected to the second output port 214b of which output voltage is 18 V and the third output port 214c of which output voltage is 14.4 V.

The second tool-side unit 250b is designed exclusively for the second electric power tool 50b. Therefore the second tool-side unit 250b is configured to be removably attached to the battery interface 52b of the second electric power tool 50b, but not to be attached to the battery interface 52a of the first electric power tool 50a and the battery interface 52c of the third electric power tool 50c. Here the second electric power tool 50b encloses a motor 54b of which rated voltage is 18 V, and the rated voltage of the second electric power tool 50b is also predetermined to be 18 V. The second tool-side unit 250b has a second electric cord 260b so as to be connected to the second output port 214b of the battery-side unit 210 via the second electric cord 260b. The second electric cord 260b has a plug 262b at the base end thereof that interfits only with the second output port 214b. In other words, the plug 262b of the second electric cord 260b does not interfit with the first output port 214a and the third output port 214c. Because of this configuration, the second electric power tool 50b of which rated voltage is 18 V can always be connected to the second output port 214b of which output voltage is 18 V, and cannot be connected to the first output port 214a of which output voltage is 36 V and the third output port 214c of which output voltage is 14.4 V.

The third tool-side unit 250c is designed exclusively for the third electric power tool 50c. Therefore the third tool-side unit 250c is configured to be removably attached to the battery interface 52c of the third electric power tool 50c, but not to be attached to the battery interface 52a of the first electric power tool 50a and the battery interface 52b of the second electric power tool 50b. Here the third electric power tool 50c encloses a motor 54c of which rated voltage is 14.4 V, and the rated voltage of the third electric power tool 50c is also predetermined to be 14.4 V. The third tool-side unit 250c has a third electric cord 260c so as to be connected to the third output port 214c of the battery-side unit 210 via the third electric cord 260c. The third electric cord 260c has a plug 262c at the base end thereof, that interfits only with the third output port 214c. In other words, the plug 262c of the third electric cord 260c does not interfit with the first output port 214a and the second output port 214b. Because of this configuration, the third electric power tool 50c of which rated voltage is 14.4 V can always be connected to the third output port 214c of which output voltage is 14.4 V, and cannot be connected to the first output port 214a of which output voltage is 36 V and the second output port 214b of which output voltage is 18 V.

As FIG. 9 illustrates, in the battery-side unit 210, the four battery interfaces 212 are electrically connected to the three output ports 214a to 214c via the voltage regulator circuit 230. Therefore the power from the battery packs 10 is output from the three output ports 214a to 214c via the voltage regulator circuit 230. The voltage regulator circuit 230 is a circuit to transform DC voltage. The voltage regulator circuit 230 can output the 36 V voltage from the first output port 114a, the 18 V voltage from the second output port 114b, and the 14.4 V voltage from the third output port 114c, regardless of the output voltage (nominal voltage) of the battery pack 10.

The voltage regulator circuit 230 is provided with a microcomputer 232, and the microcomputer 232 controls the operation of the voltage regulator circuit 230. If a battery pack 10 is attached to the battery interface 212, the microcomputer 232 is electrically connected to the storage device 14 of the battery pack 10. The microcomputer 232 accesses the storage device 14 of the battery pack 10, and reads the product information stored therein. As a result, the microcomputer 232 can detect a nominal voltage of the attached battery pack 10. By accessing the storage device 14 of the battery pack 10, the microcomputer 232 can also detect the number of battery packs 10 attached to the battery-side unit 210. The microcomputer 232 switches the mode of operation of the voltage regulator circuit 230 according to the number of battery packs 10 attached to the battery-side unit 210 and the respective nominal voltages thereof. Thereby a corresponding voltage (36 V, 18 V, 14.4 V) can be output from each output port 214a to 214c, regardless of the number of battery packs 10 attached to the battery-side unit 210 and the nominal voltages thereof.

As described above, the adapter 200 of this example is provided with the voltage regulator circuit 230, whereby the supply voltage to the electric power tool 50a or 50b can be transformed corresponding to the nominal voltage of the battery pack 10. As a result, the voltage corresponding to the rated voltage (36 V, 18 V, 14.4 V) can be supplied to the electric power tool 50a, 50b or 50c to be used by the user. Therefore the user can use the first electric power tool 50a of which rated voltage is 36 V using battery packs 10 of which nominal voltages are 14.4 V and 18 V. According to this adapter 200, the user need not always prepare a battery pack of which nominal voltage is 36 V to use the first electric power tool 50a. Furthermore, a voltage corresponding to the rated voltage can be supplied from the same battery packs 10 to the second electric power tool 50b of which rated voltage is 18 V and the third electric power tool 50c of which rated voltage is 14.4 V.

Figure 10:
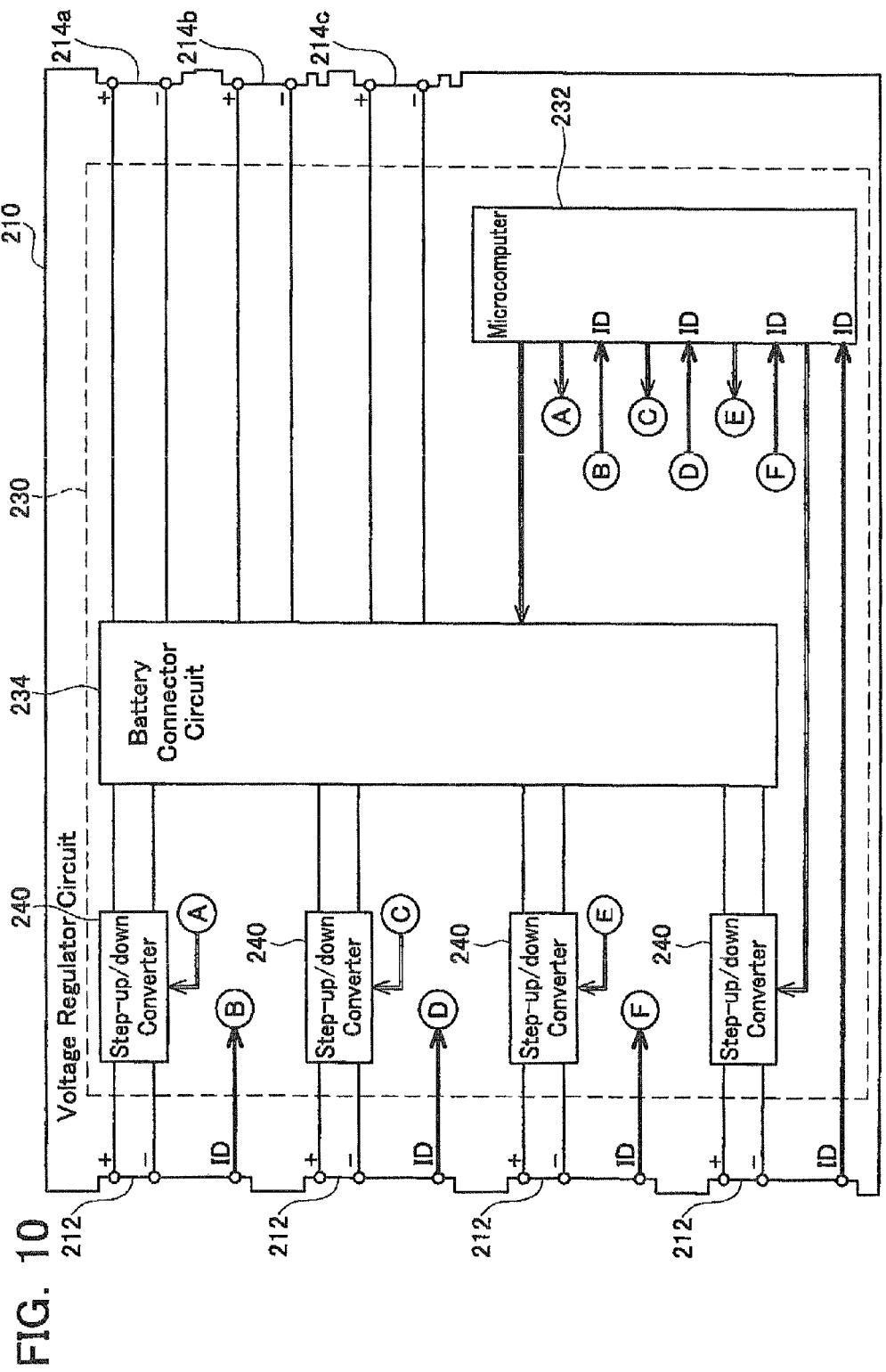
FIG. 10 illustrates an example of a voltage regulator circuit of Second Embodiment.

The configurations, functions and applications of the adapter 200 have been described. An example of the internal configuration of the voltage regulator circuit 230 will now be described with reference to FIG. 10 and FIG. 11. As FIG. 10 illustrates, the voltage regulator circuit 230 is provided with the microcomputer 232, a battery connector circuit 234 and four step-up/down converters 240. The battery connector circuit 234 alternatively connects the four battery interfaces 212 to one of the three output ports 214a to 214c. The four step-up/down converters 240 are disposed between the four battery interfaces 212 and the battery connector circuit 234. The configurations, functions and applications of the four step-up/down converters 240 are the same as those of the four step-up/down converters 140 described in First Embodiment (see FIG. 3), therefore the description thereof is omitted here.

Figure 11:
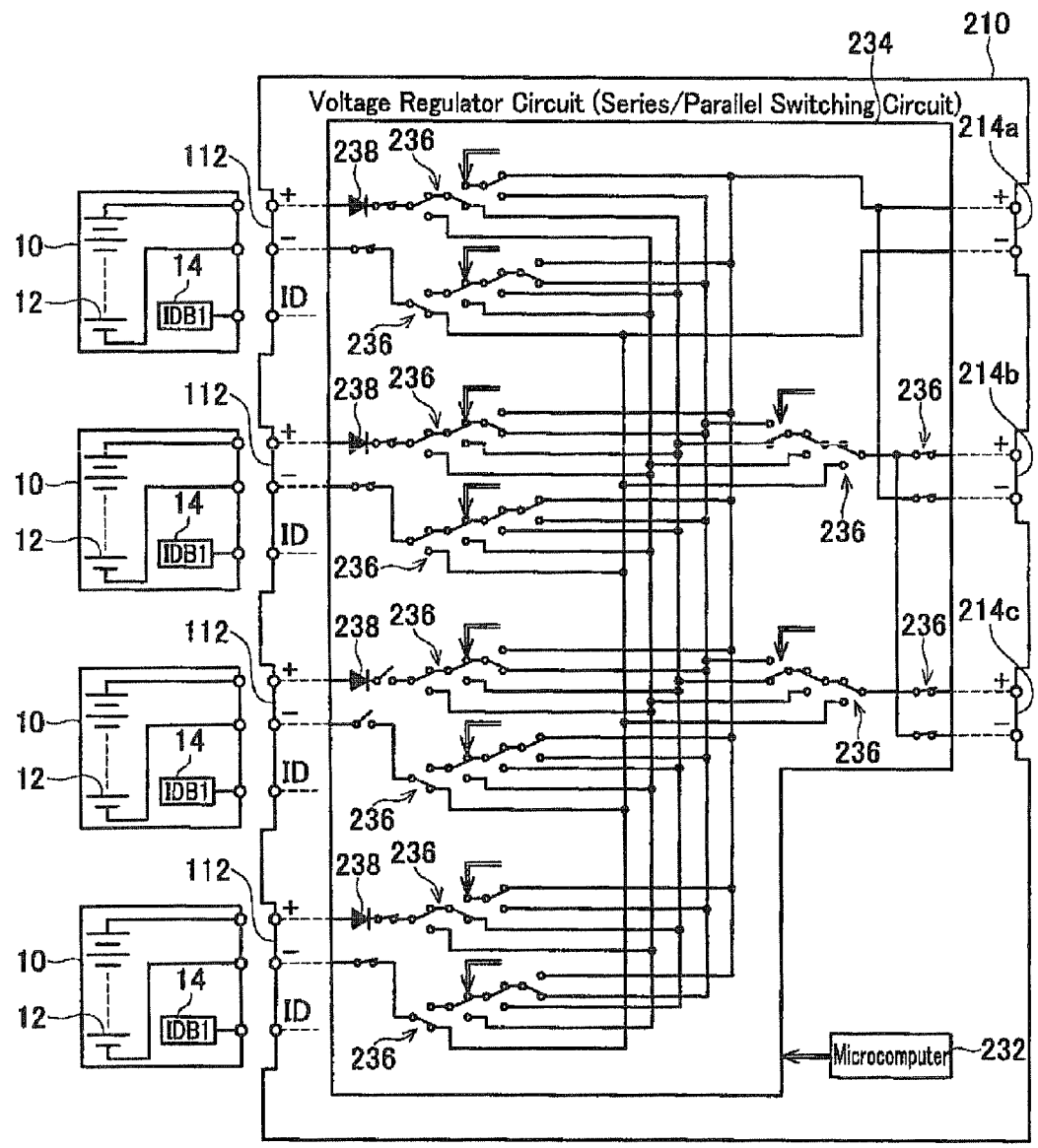
FIG. 11 illustrates an example of a battery connector circuit of Second Embodiment.

As FIG. 11 illustrates, the battery connector circuit 234 has a plurality of switching elements 236 and diodes 238. Thereby the battery connector circuit 234 can connect the four battery interfaces 212 in series, or connect the four battery interfaces 212 in parallel, or connect the four battery interfaces 212 in a combination of a series and parallel connections. The battery connector circuit 234 can also alternatively connect the interconnected four battery interfaces 212 to one of the three output ports 214a to 214c. Thereby a 36 V voltage can be output from the first output port 214a if the user uses the first electric power tool 50a, an 18 V voltage can be output from the second output port 214b if the user uses the second electric power tool 50b, and a 14.4 V voltage can be output from the third output port 214c if the user uses the third electric power tool 50c.

Third Embodiment

Figure 12:
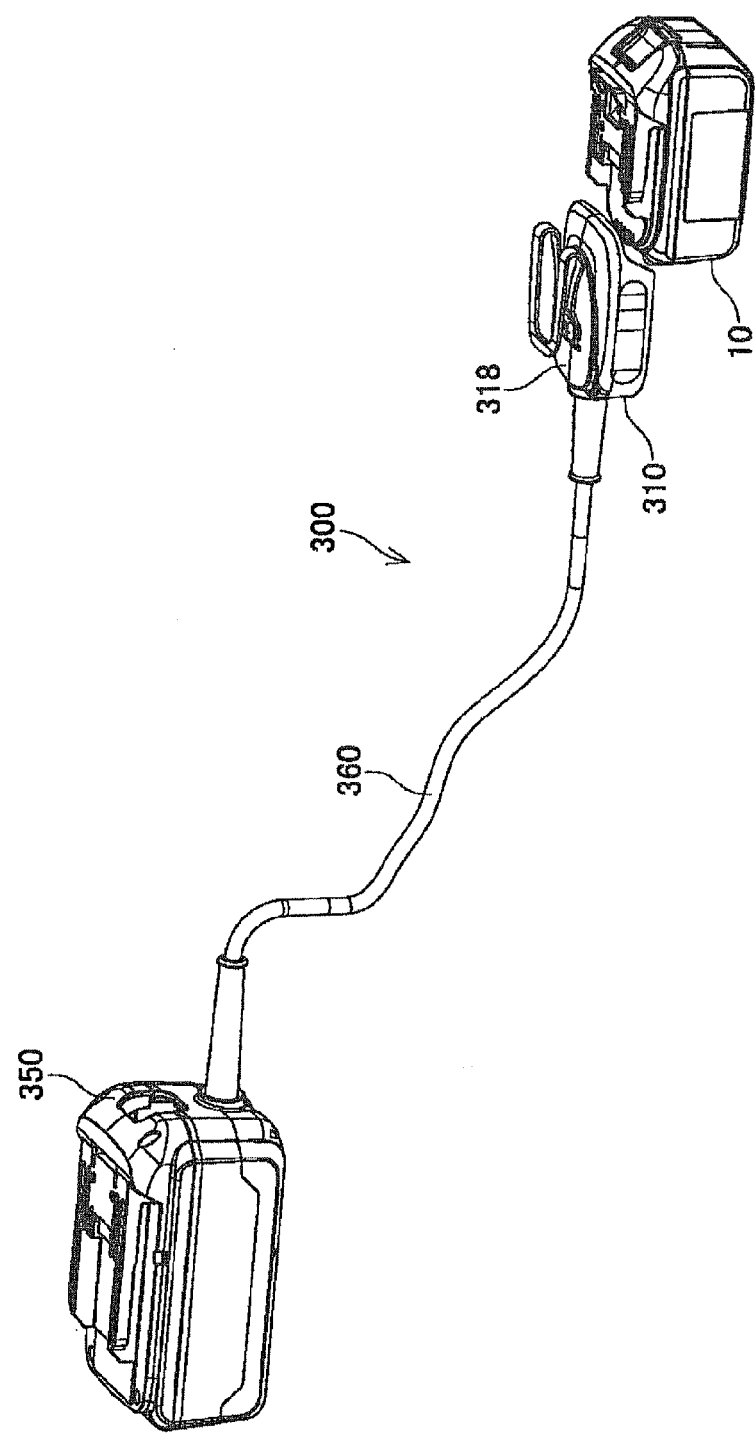
FIG. 12 is an external view of an adapter of Third Embodiment.
Figure 13:
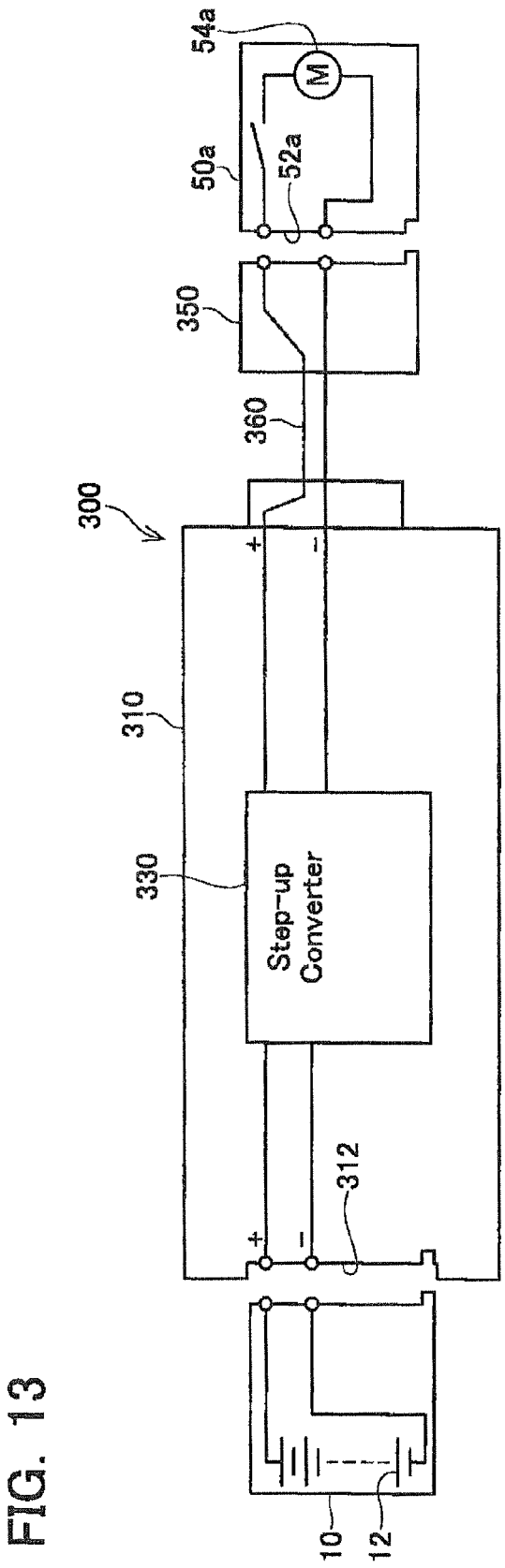
FIG. 13 is a schematic diagram depicting a circuit structure of the adapter of Third Embodiment.

An adapter 300 of Third Embodiment will now be described with reference to the drawings. FIG. 12 is an external view of the adapter 300, and FIG. 13 is a schematic diagram of a circuit structure of the adapter 300. The adapter 300 is an apparatus configured to connect one battery pack 10 of which nominal voltage is 18 V to the first electric power tool 50a (see FIG. 1 and FIG. 8) of which rated voltage is 36 V. As FIG. 12 and FIG. 13 illustrate, the adapter 300 is provided with a battery-side unit 310 and a tool-side unit 350. The battery-side unit 310 and the tool-side unit 350 are electrically connected via an electric cord 360. The tool-side unit 350 has a hook 318 so that the user can attach the tool-side unit 350 to a belt worn around the waist.

The battery-side unit 310 has one battery interface 312. The battery interface 312 removably receives a battery pack 10 of which nominal voltage is 18 V. The battery interface 312 mechanically and electrically connects the attached battery pack 10. This battery pack 10 is used by itself for an electric power tool of which rated voltage is 18 V (e.g. second electric power tool 50b). The battery pack 10 of which nominal voltage is 18 V cannot be used directly for the first electric power tool 50a of which rated voltage is 36 V.

The tool-side unit 350 is designed exclusively for the first electric power tool 50a of which rated voltage is 36 V. For example, the tool-side unit 350 is configured to be removably attached to the battery interface 52a of the first electric power tool 50a, but not to be attached to the battery interface 52b of the second electric power tool 50b and the battery interface 52c of the third electric power tool 50c. The tool-side unit 350 can be mechanically and electrically connected to only the battery interface 52a of the first electric power tool 50a.

As FIG. 13 illustrates, the battery-side unit 310 encloses a step-up converter 330, and the battery pack 10 and the first electric power tool 50a are interconnected via the step-up converter 330. The step-up converter 330 is a DC-DC converter that steps up a DC voltage. The step-up converter 330 is designed to input an 18 V voltage and output a 36 V voltage. Thereby the supply voltage from the battery pack 10 to the first electric power tool 50a can be adjusted to a level corresponding to the rated voltage of the first electric power tool 50a (that is, 36 V).

As described above, the adapter 300 of this example is provided with the step-up converter 330, whereby 36 V DC voltage can be supplied from the battery pack 10 of which nominal voltage is 18 V to the first electric power tool 50a of which rated voltage is 36 V. As a result, the user can use the first electric power tool 50a of which rated voltage is 36 V using the battery pack 10 of which nominal voltage is 18 V. According to this adapter 300, the user need not always prepare a battery pack of which nominal voltage is 36 V to use the first electric power tool 50a. The user can use the battery pack 10 of which the nominal voltage is 18 V not only for the second electric power tool 50b of which rated voltage is 18 V, but also for the first electric power tool 50a of which rated voltage is 36 V.

The adapter 300 of this example has a configuration to connect only one battery pack 10 to the first electric power tool 50a, but may also be configured to connect a plurality of battery packs 10 to the first electric power tool 50a, just like the adapter 100 of First Embodiment and the adapter 200 of Second Embodiment. In this case, the adapter 300 may be configured to receive a plurality of battery packs 10 of which nominal voltages are the same, or to receive a plurality of battery packs 10 of which nominal voltages are different. In this case, the design of the number of step-up converters 330 installed in the adapter 300 and the specifications thereof are changed according to the number of battery packs 10 to be received and the nominal voltages thereof.

Fourth Embodiment

Figure 14:
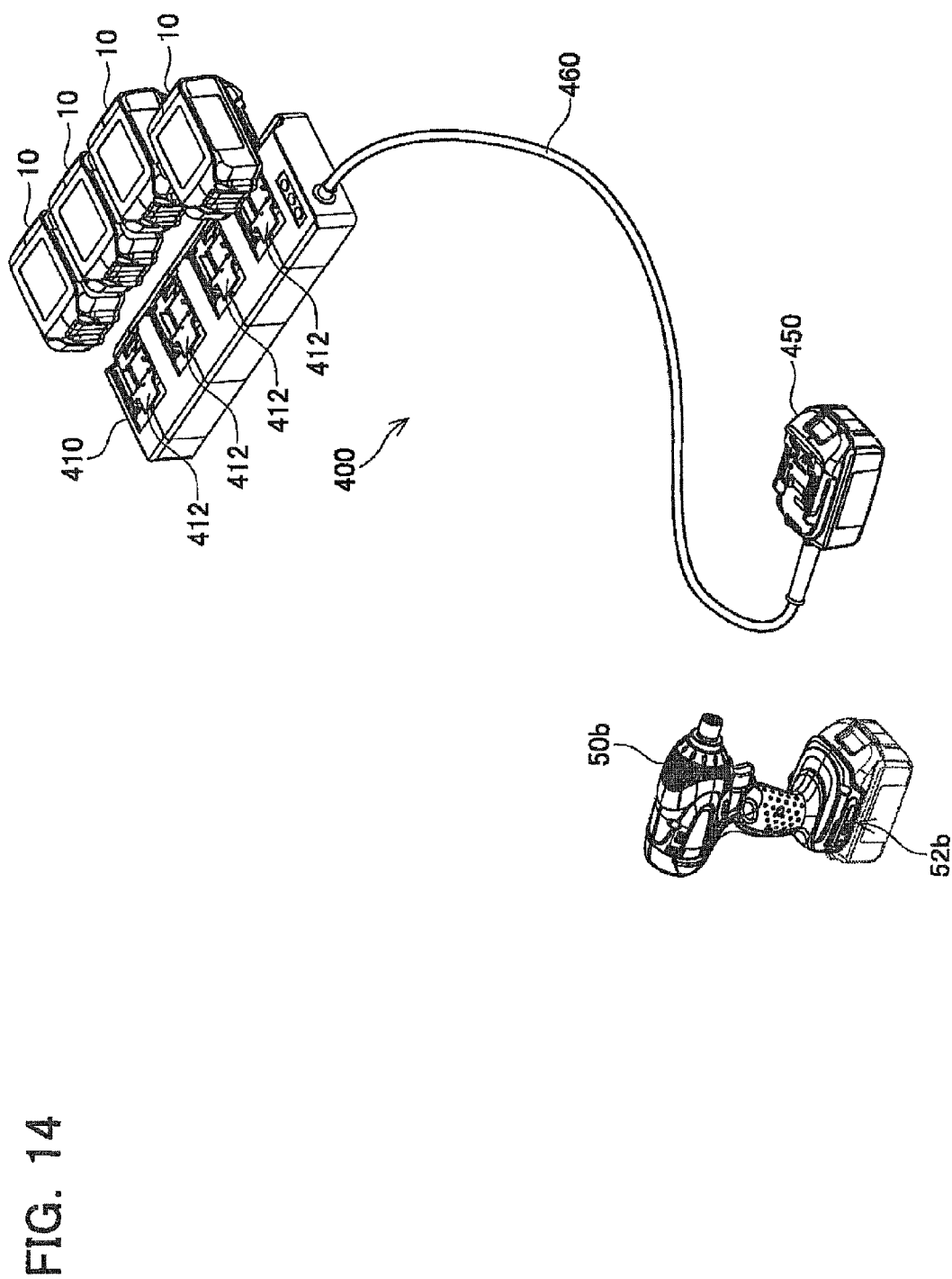
FIG. 14 is an external view of an adapter of Fourth Embodiment.
Figure 15:
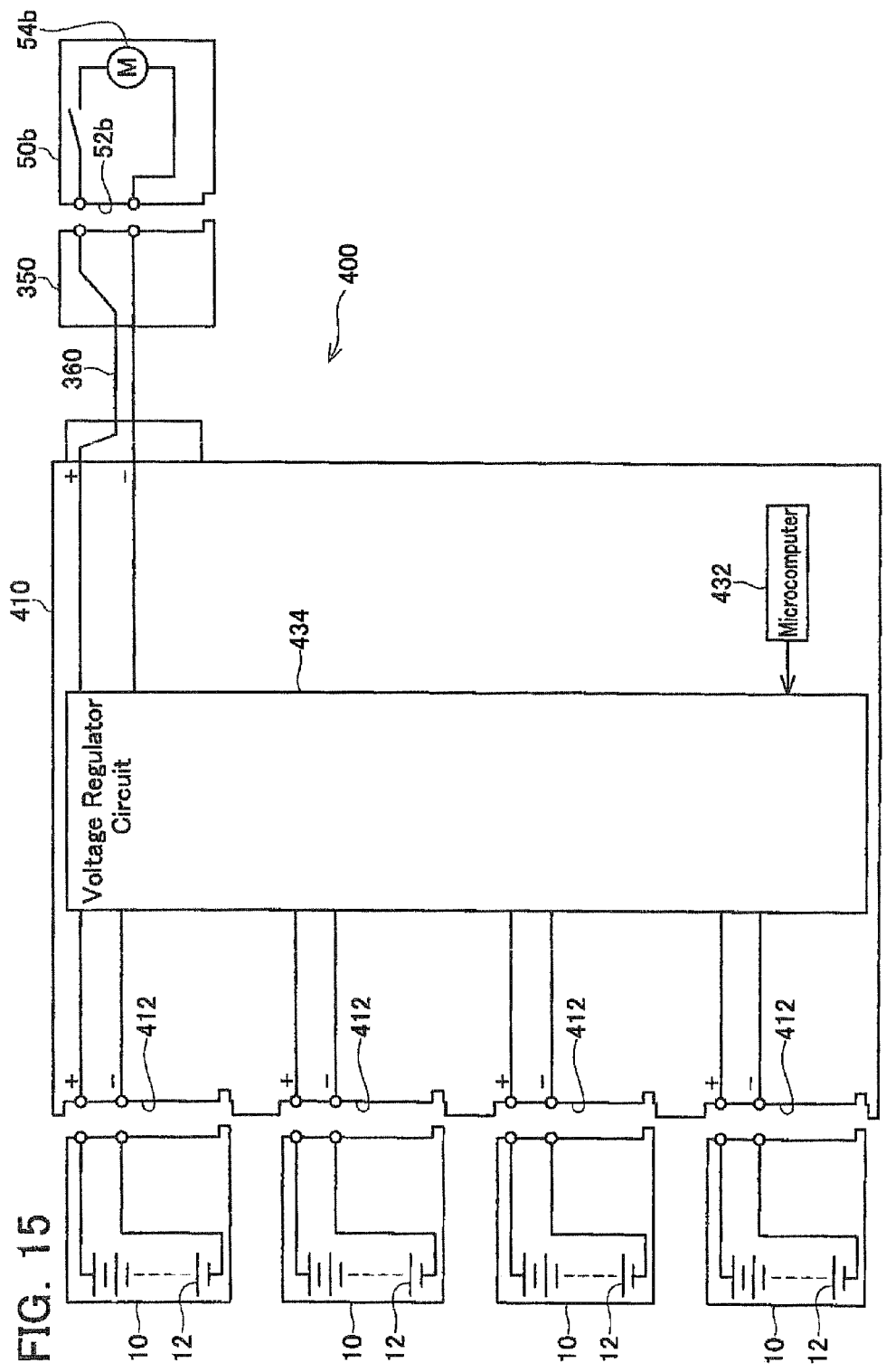
FIG. 15 is a schematic diagram depicting a circuit structure of the adapter of Fourth Embodiment.

An adapter 400 of Fourth Embodiment will now be described with reference to the drawings. FIG. 14 is an external view of the adapter 400, and FIG. 15 is a schematic diagram of a circuit structure of the adapter 400. As FIG. 14 and FIG. 15 illustrate, the adapter 400 is an apparatus configured to connect a maximum of four battery packs 10 to the second electric power tool 50b. The adapter 400 is provided with a battery-side unit 410 and a tool-side unit 450. The battery-side unit 410 and the tool-side unit 450 are electrically connected to each other via an electric cord 460.

The battery-side unit 410 has four battery interfaces 412. Each battery interface 412 removably receives one battery pack 10. This means that a maximum of four battery packs 10 can be attached to the battery-side unit 410. Each battery interface 412 mechanically and electrically connect the attached battery pack 10. At least one battery pack 10 need be attached to the battery-side unit 410.

Each battery interface 412 is designed exclusively for a battery pack 10 of which nominal voltage is 18 V. This means that each battery interface 412 is configured to removably receive a battery pack 10 of which nominal voltage is 18 V, but not to receive a battery pack of which nominal voltage is not 18 V. As a result, it is prevented that a battery pack of which nominal voltage is not 18 V is attached to the battery-side unit 410.

The tool-side unit 450 is designed exclusively for the second electric power tool 50b of which rated voltage is 18 V. Therefore the tool-side unit 450 is configured to be removably attached to the battery interface 52b of the second electric power tool 50b, but not to be attached to the battery interface of an electric power tool of which rated voltage is not 18 V (e.g. first electric power tool 50a and the third electric power tool 50c). Thereby it is prevented that the tool-side unit 450 is attached to an electric power tool of which rated voltage is not 18 V.

Figure 16:
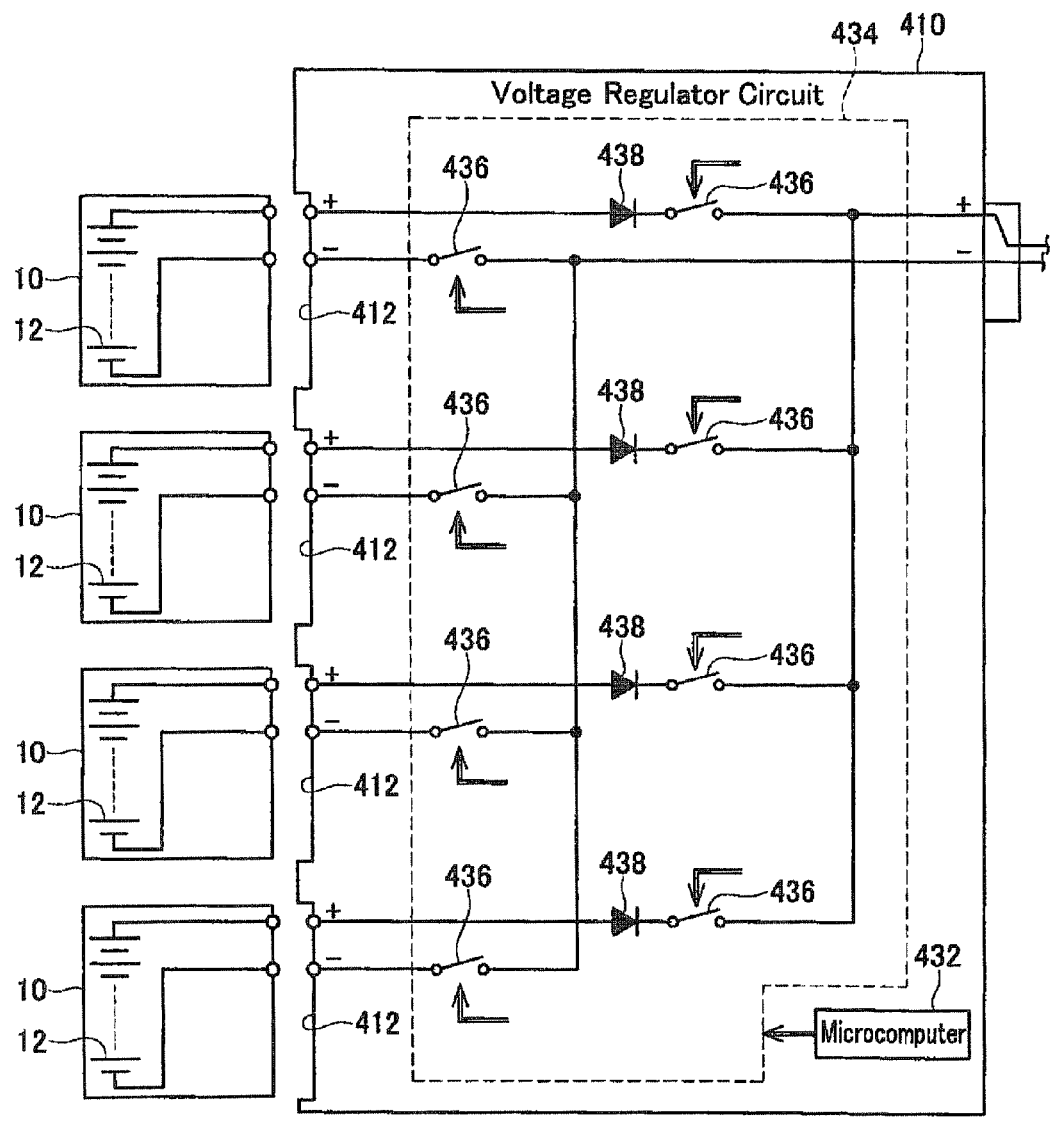
FIG. 16 illustrates an example of a battery connector circuit of Fourth Embodiment.

As FIG. 15 illustrates, the battery-side unit 410 encloses a microcomputer 432 and a battery connector circuit 434. A battery pack 10 attached to the battery-side unit 310 is connected, via the battery connector circuit 434, to the second electric power tool 50b to which the tool-side unit 350 is attached. FIG. 16 illustrates a circuit structure of the battery connector circuit 434. As FIG. 16 illustrates, the battery connector circuit 434 is a circuit to connect four battery interfaces 412 in parallel. The adapter 400 of this example is configured to connect one or a plurality of battery packs 10 of which nominal voltage is 18 V to the second electric power tool 50b of which rated voltage is 18 V. Therefore the battery connector circuit 434 connects all the battery packs 10, attached to the battery-side unit 410, in parallel so that the supply voltage from the battery packs 10 to the second electric power tool 50b becomes a level corresponding to the rated voltage of the second electric power tool 50b (that is, 18 V).

As FIG. 16 illustrates, the battery connector circuit 434 has a pair of switching elements 436 and a diode 438 for each battery interface 412. These switching elements 436 are controlled by the microcomputer 432. As described above, four battery packs 10 need not always be attached to the battery-side unit 410. In the battery-side unit 410, one or a plurality of battery packs 10 is often attached to only a part of the battery interfaces 412. In this case, a foreign substance could contact an exposed terminal in the remaining battery interfaces 412. Hence the microcomputer 432 normally turns each switching element 436 OFF, and only turns a pair of switching elements 436 ON that corresponds to a battery interface 412 that has received a battery pack 10. As a result, the battery interfaces 412 that have received the battery packs 10 are connected to one another, and a battery interface 412 that has not received a battery pack 10 is electrically disconnected from the battery interfaces 412 that have received the battery packs 10. Thereby it is prevented that the DC voltage from the battery pack 10 is applied to an exposed terminal of the battery interface 412. Whether a battery pack 10 has been attached to a battery interface 412 can be detected by monitoring the voltage of a terminal disposed in the battery interface 412. A switch configured to contact the attached battery pack 10 may be disposed in the battery interface 412.

As described above, with the battery connector circuit 434 being provided, the adapter 400 of this example can supply power from a plurality of battery packs 10 to the second electric power tool 50b. Thereby the user can continuously use the second electric power tool 50b for a long period of time. According to the adapter 400, the user can use the second electric power tool 50b for a dramatically longer time using a plurality of already owned small capacity battery packs 10, without purchasing a new large capacity battery pack.

The adapter 400 of this example is designed exclusively for the battery pack 10 of which nominal voltage is 18 V and the second electric power tool 50b of which rated voltage is 18 V, but the voltage values are not limited to 18 V, and [the adapter 400] can also be designed exclusively for a battery pack having a different nominal voltage and an electric power tool having a different rated voltage.

Fifth Embodiment

Figure 17:
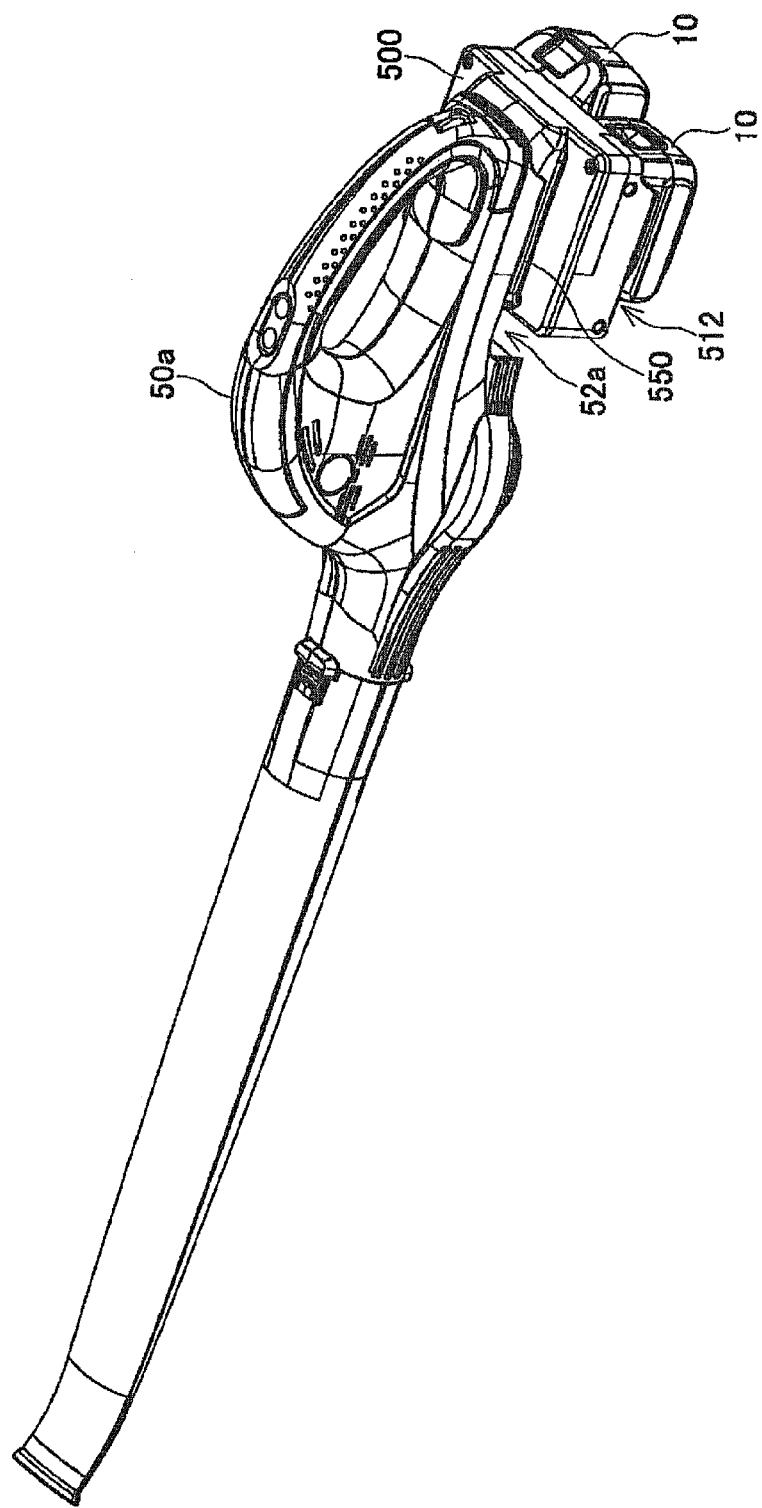
FIG. 17 is an external view of an adapter of Fifth Embodiment.
Figure 18:
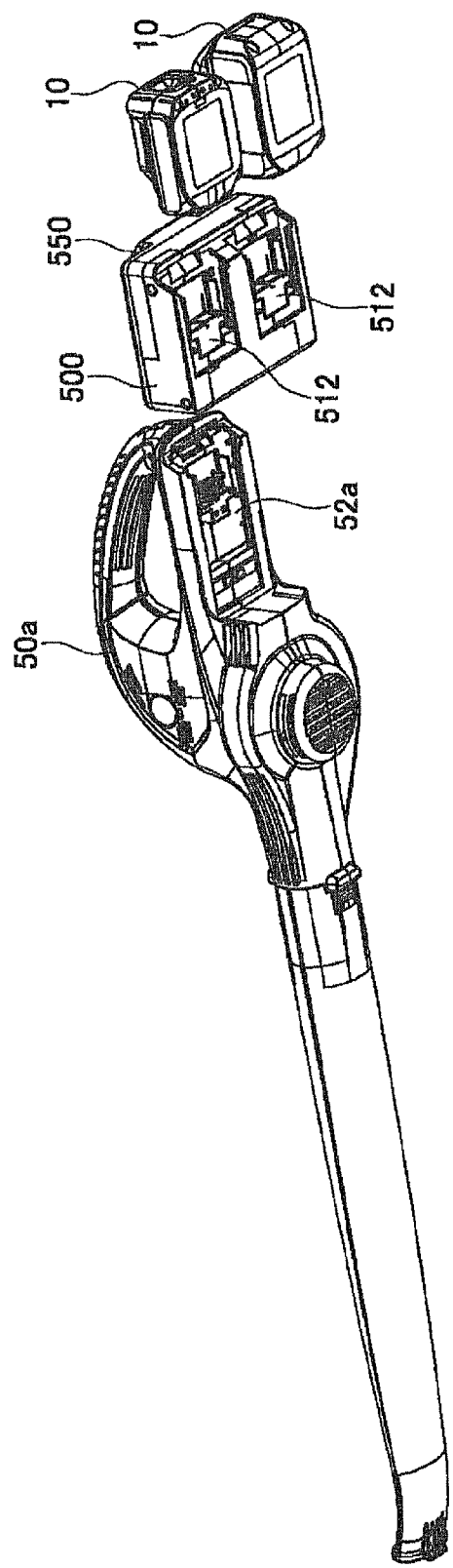
FIG. 18 is an external view of the adapter of Fifth Embodiment.
Figure 19:
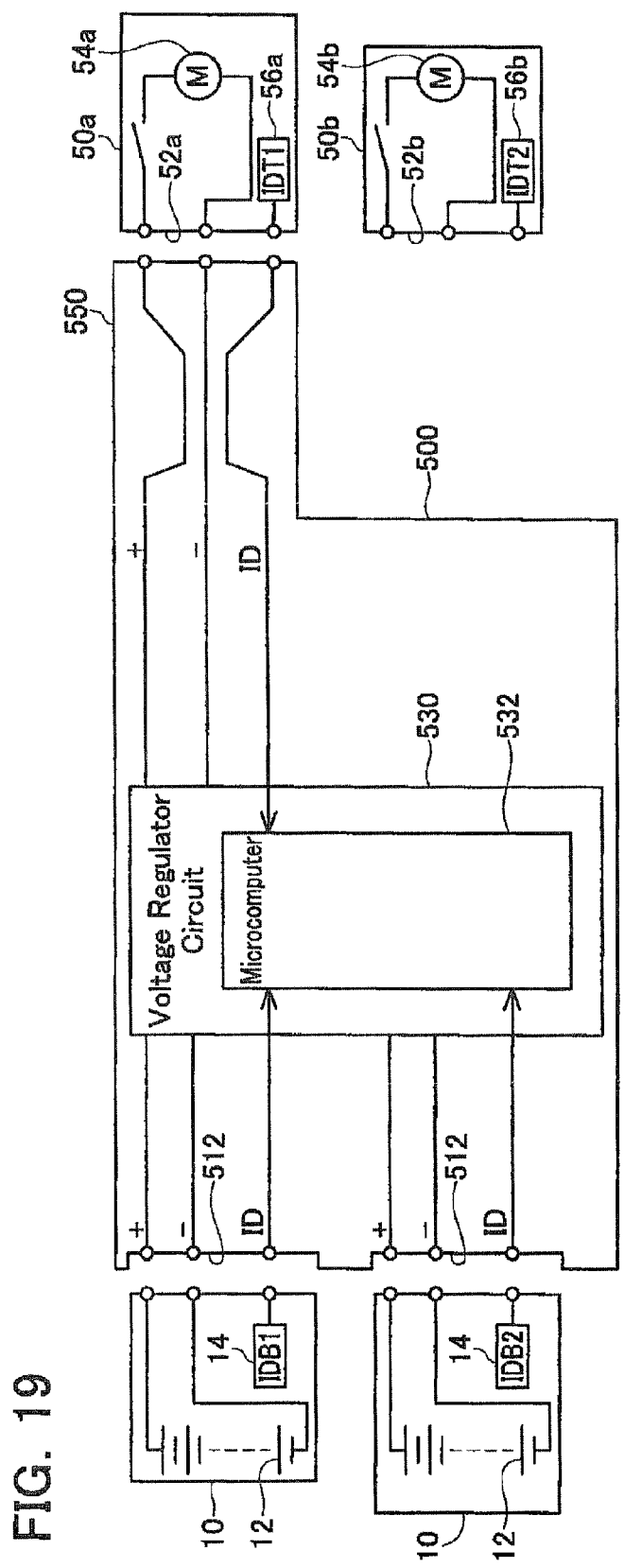
FIG. 19 is a schematic diagram depicting a circuit structure of the adapter of Fifth Embodiment.

An adapter 500 of Fifth Embodiment will now be described with reference to the drawings. FIG. 17 and FIG. 18 are external views of the adapter 500, and FIG. 19 is a schematic diagram of a circuit structure of the adapter 500. As FIG. 17 to FIG. 19 illustrate, the adapter 500 is an apparatus configured to alternatively connect a maximum of two battery packs 10 to the first electric power tool 50a or the second electric power tool 50b. In FIG. 17 and FIG. 18, the first electric power tool 50a is omitted. Unlike the above mentioned adapter 100 of First Embodiment to the adapter 400 of Fourth Embodiment, the adapter 500 of this example is a cordless type, and is constituted by one housing.

The adapter 500 has two battery interfaces 512. The two battery interfaces 512 are disposed on a bottom face of the housing of the adapter 500. Each battery interface 512 removably receives one battery pack 10. This means that a maximum of two battery packs 10 can be attached to the adapter 500. Each battery interface 512 mechanically and electrically connects the attached battery packs 10. Each battery pack 10 is the same as that described in First Embodiment, and encloses a plurality of battery cells 12 and the storage device 14.

Each battery interface 512 can alternatively receive a battery pack 10 of which nominal voltage is 14.4 V and a battery pack 10 of which nominal voltage is 18 V, just like the battery interface 112 described in First Embodiment. In the example in FIG. 17 to FIG. 19, one battery pack 10 of which nominal voltage is 14.4 V and one battery pack 10 of which nominal voltage is 18 V are attached to the adapter 500. Two battery packs 10 need not always be attached to the adapter 500, but at least one battery pack 10 can be attached.

The adapter 500 is provided with a tool connector 550. The tool connector 550 is disposed on a top face of the housing of the adapter 500. The tool connector 550 is configured to be removably attached to the battery interface 52a of the first electric power tool 50a, and to also be removably attached to the battery interface 52c of the second electric power tool 50b. As described above, the rated voltage of the first electric power tool 50a is 36 V and the rated voltage of the second electric power tool 50b is 18 V. In this example, just like the embodiment illustrated in FIG. 7, each electric power tool 50a and 50b is provided with a storage device 56a or 56b storing the product information. Product information includes one datum that specifies the rated voltage of the electric power tool 50a or 50b.

As FIG. 19 illustrates, in the adapter 500, two battery interfaces 512 are electrically connected to the tool connector 550 via the voltage regulator circuit 530. Therefore the power from the battery pack 10 is output from the tool connector 550 via the voltage regulator circuit 530. The voltage regulator circuit 530 is a circuit to transform DC voltage. The voltage regulator circuit 530 can increase or decrease the output voltage outputted from the tool connector 550 with respect to the output voltage (nominal voltage) of the battery pack 10. In other words, the voltage regulator circuit 530 can regulate the supply voltage from the battery pack 10 to the electric power tool 50a or 50b on at least two levels.

The voltage regulator circuit 530 is provided with a microcomputer 532, and the microcomputer 532 controls the operation of the voltage regulator circuit 530. If the adapter 500 is attached to the first electric power tool 50a or the second electric power tool 50b, the microcomputer 532 is electrically connected to the storage device 56a or 56b of the electric power tool 50a or 50b. The microcomputer 532 accesses the connected storage device 56a or 56b and reads the product information stored therein. As a result, the microcomputer 532 can identify which of the electric power tools 50a or 50b the adapter 500 is attached. The microcomputer 532 determines a target value of the output voltage outputted from the tool connector 550 according to the electric power tool 50a or 50b to which the adapter 500 is connected. In other words, if the adapter 500 is connected to the first electric power tool 50a, the microcomputer 532 sets the target value of the output voltage outputted from the tool connector 550 to a level corresponding to the rated voltage of the first electric power tool 50a (that is, 36 V). If the adapter 500 is connected to the second electric power tool 50b, on the other hand, [the microcomputer 532] sets the target value of the output voltage outputted from the tool connector 550 to a level corresponding to the rated voltage of the second electric power tool 50b (that is, 18 V). As a result, regardless of which of the electric power tools 50a or 50b the user uses, the supply voltage from the battery pack 10 to the electric power tool 50a or 50b can be regulated to a level corresponding to the rated voltage of the electric power tool 50a or 50b.

Furthermore, if a battery pack 10 is attached to the battery interface 512, the microcomputer 532 is electrically connected to the storage device 14 of the battery pack 10. The microcomputer 532 accesses the storage device 14 of the battery pack 10 and reads the product information stored therein. Then the microcomputer 532 switches the mode of operation of the voltage regulator circuit 530 according to the obtained product information. This aspect is the same as the voltage regulator circuit 130 described in First Embodiment, hence description thereof is omitted here.

As described above, the adapter 500 of this example is provided with the voltage regulator circuit 530, whereby the supply voltage to the electric power tool 50a or 50b can be transformed corresponding to the nominal voltage of the battery pack 10. As a result, the voltage corresponding to the rated voltage thereof (36 V, 18 V) can be supplied to the electric power tool 50a or 50b to be used by the user. Therefore the user can use the first electric power tool 50a of which rated voltage is 36 V using the battery packs 10 of which nominal voltages are 14.4 V and 18 V. According to this adapter 500, the user need not always prepare a battery pack of which nominal voltage is 36 V to use the first electric power tool 50a. Furthermore, to the second electric power tool 50b of which rated voltage is 18 V as well, the voltage corresponding to the rated voltage thereof (that is, 18 V) can be supplied from the same battery pack 10.

The voltage regulator circuit 530 of this example can be configured in the same way as the voltage regulator circuit 130 described in First Embodiment (see FIG. 3, FIG. 4 and FIG. 5). For example, the voltage regulator circuit 530 of this example can be configured using at least either a step-up/down converter to transform the DC voltage from the battery pack 10, or a battery connector circuit to switch the mode of connection of the two battery packs 10.

Sixth Embodiment

Figure 20:
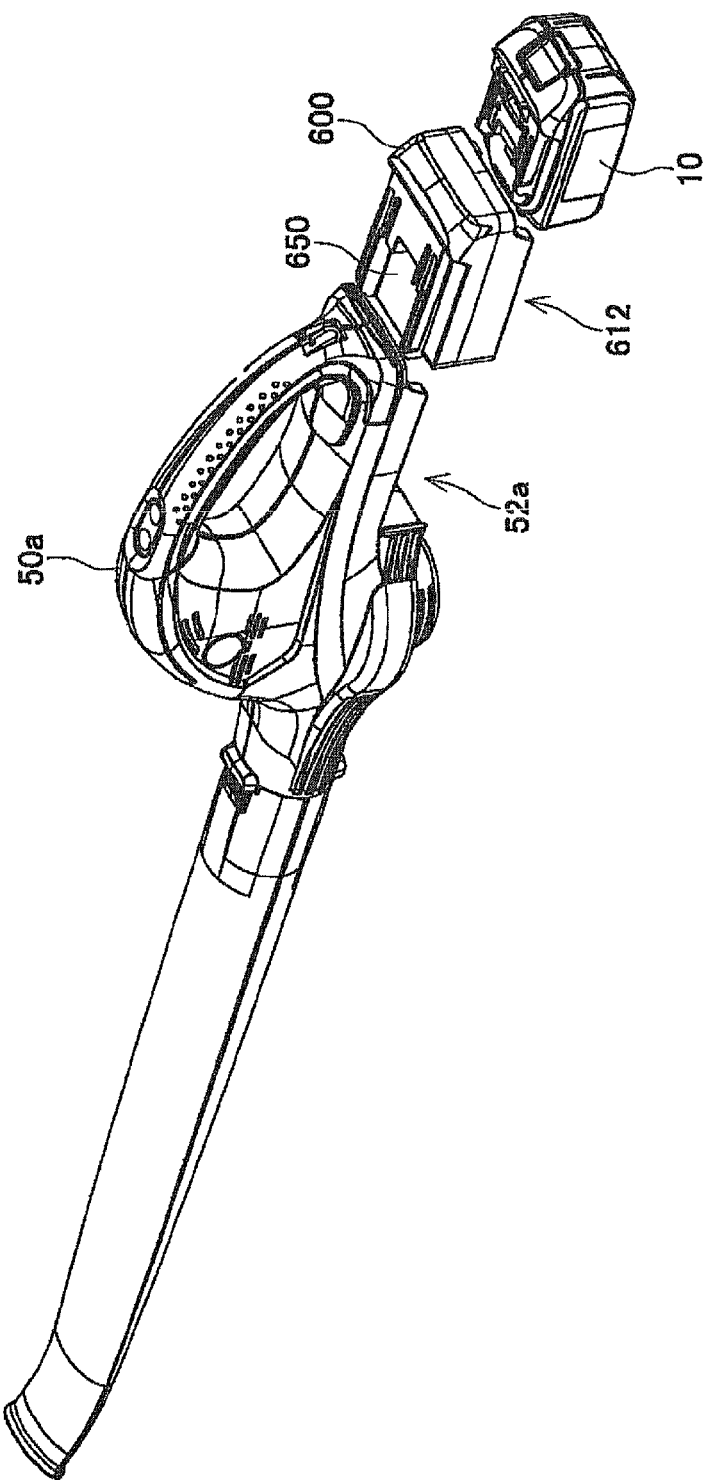
FIG. 20 is an external view of an adapter of Sixth Embodiment.
Figure 21:
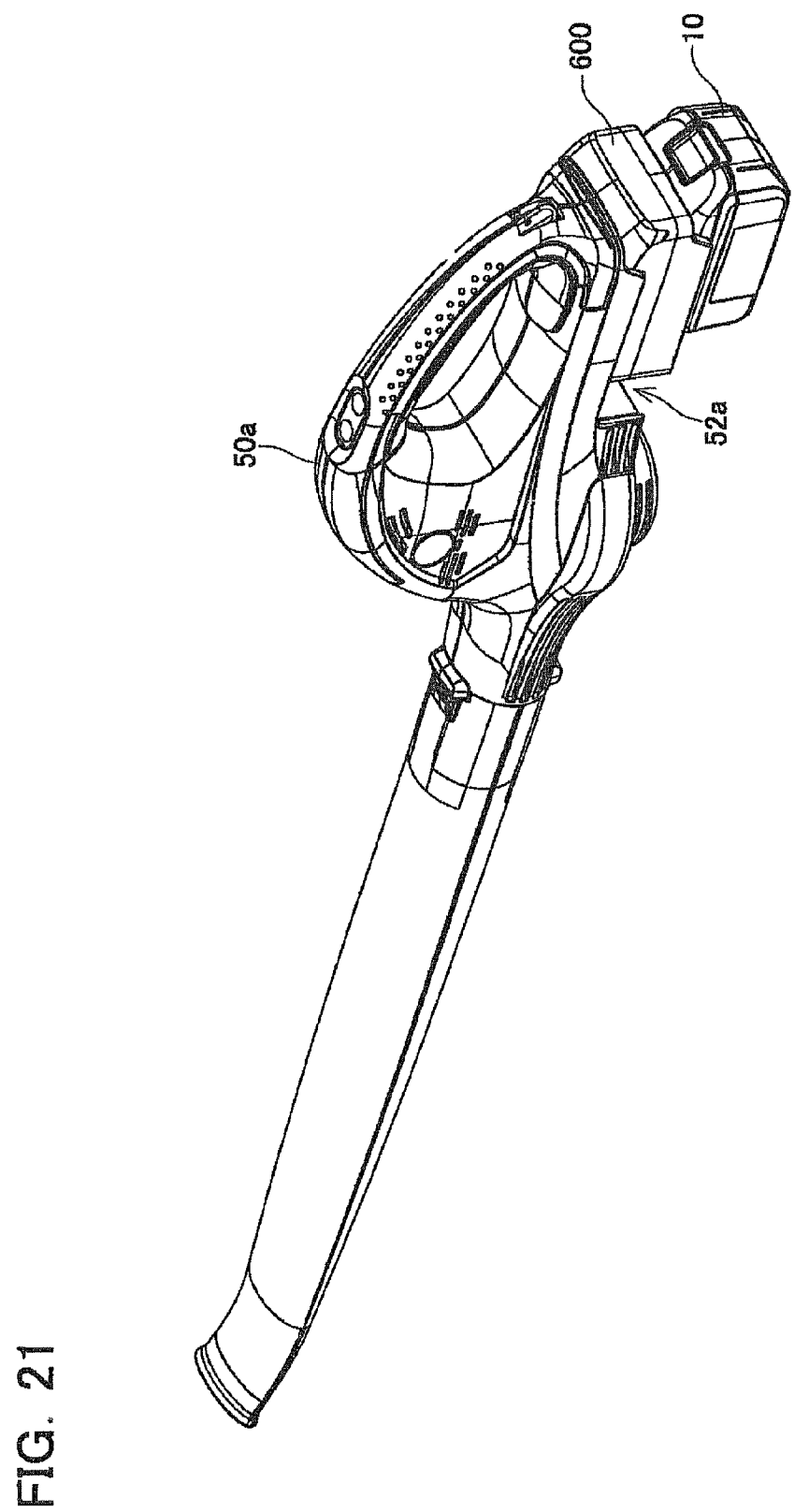
FIG. 21 is an external view of the adapter of Sixth Embodiment.
Figure 22:
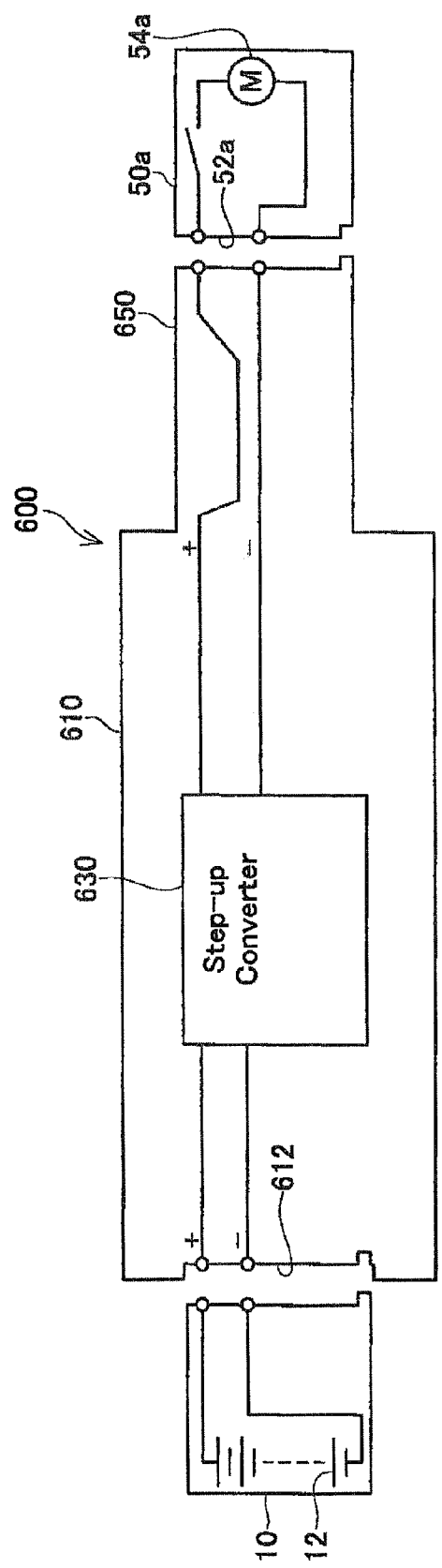
FIG. 22 is a schematic diagram depicting a circuit structure of the adapter of Sixth Embodiment.

An adapter 600 of Sixth Embodiment will now be described with reference to the drawings. FIG. 20 and FIG. 21 are external views of the adapter 600, and FIG. 22 is a schematic diagram of a circuit structure of the adapter 600. The adapter 600 is an apparatus configured to connect one battery pack 10 of which nominal voltage is 18 V to the first electric power tool 50a of which rated voltage is 36 V. The adapter 600 of this example is a cordless type and is constituted by one housing.

The adapter 600 has one battery interface 612. The battery interface 612 is disposed on a bottom face of the housing of the adapter 600. The battery interface 612 removably receives a battery pack 10 of which nominal voltage is 18 V. The battery interface 612 mechanically and electrically connects the attached battery pack 10. Normally this battery pack 10 of which nominal voltage is 18 V cannot be used directly for the first electric power tool 50a of which rated voltage is 36 V.

The adapter 600 is provided with a tool connector 650. The tool connector 650 is disposed on a top face of the housing of the adapter 600. The tool connector 650 is designed exclusively for the first electric power tool 50a of which rated voltage is 36 V. Therefore the adapter 600 is configured to be removably attached to the battery interface 52a of the first electric power tool 50a, but not to be attached to an electric power tool having another rated voltage (e.g. second electric power tool 50b). In other words, the adapter 600 can be mechanically and electrically connected to only the battery interface 52a of the first electric power tool 50a.

As FIG. 22 illustrates, the adapter 600 encloses a step-up converter 630, and the battery pack 10 and the first electric power tool 50a are interconnected via the step-up converter 630. The step-up converter 630 is a DC-DC converter to step-up the DC voltage. The step-up converter 630 is designed to input an 18 V voltage and to output a 36 V voltage. Therefore the supply voltage from the battery pack 10 to the first electric power tool 50a is regulated to a level corresponding to the rated voltage of the first electric power tool 50a (that is, 36 V).

As described above, the adapter 600 of this example is provided with the step-up converter 630, whereby a 36 V DC voltage can be supplied from the battery pack 10 of which nominal voltage is 18 V to the first electric power tool 50a of which rated voltage is 36 V. Therefore the user can use the first electric power tool 50a of which rated voltage is 36 V, using the battery pack 10 of which nominal voltage is 18 V. According to this adapter 600, the user need not always prepare a battery pack of which nominal voltage is 36 V to use the first electric power tool 50a. The user can use a battery pack 10 of which nominal voltage is 18 V not only for the second electric power tool 50b of which rated voltage is 18 V, but also for the first electric power tool 50a of which rated voltage is 36 V.

Seventh Embodiment

Figure 23:
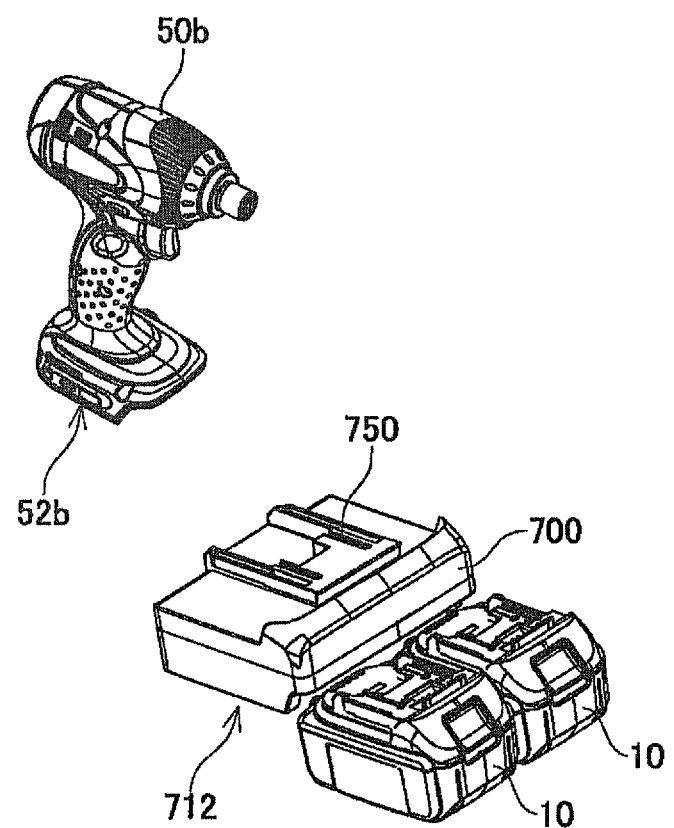
FIG. 23 is an external view of an adapter of Seventh Embodiment.

An adapter 700 of Seventh Embodiment will now be described with reference to the drawings. FIG. 23 is an external view of the adapter 700. The adapter 700 is an apparatus configured to connect a maximum of two battery packs 10 to the second electric power tool 50b. The adapter 700 of this example is a cordless type and is constituted by one housing.

The adapter 700 has two battery interfaces 712. The two battery interfaces 712 are disposed on a bottom face of the housing of the adapter 700. Each battery interface 712 removably receives one battery pack 10. This means that a maximum of two battery packs 10 can be attached to the adapter 700. Each battery interface 712 mechanically and electrically connects the attached battery pack 10. At least one battery pack 10 can be attached to the adapter 700. The battery pack 10 encloses at least a plurality of battery cells 12.

Each battery interface 712 is designed exclusively for a battery pack 10 of which nominal voltage is 18 V. Therefore each battery interface 712 is configured to removably receive a battery pack 10 of which nominal voltage is 18 V, but not to receive a battery pack 10 of which nominal voltage is not 18 V. Thereby it is prevented that a battery pack of which normal voltage is not 18 V is attached to the adapter 700.

The adapter 700 is provided with a tool connector 750. The tool connector 750 is disposed on a top face of the housing of the adapter 700. The tool connector 750 is designed exclusively for the second electric power tool 50b of which nominal voltage is 18 V. Therefore the adapter 700 is configured to be removably attached to the battery interface 52b of the second electric power tool 50b, but not to be attached to an electric power tool having another rated voltage (e.g. first electric power tool 50a). In other words, the adapter 700 can be mechanically and electrically connected to only the battery interface 52b of the second electric power tool 50b.

Figure 24:
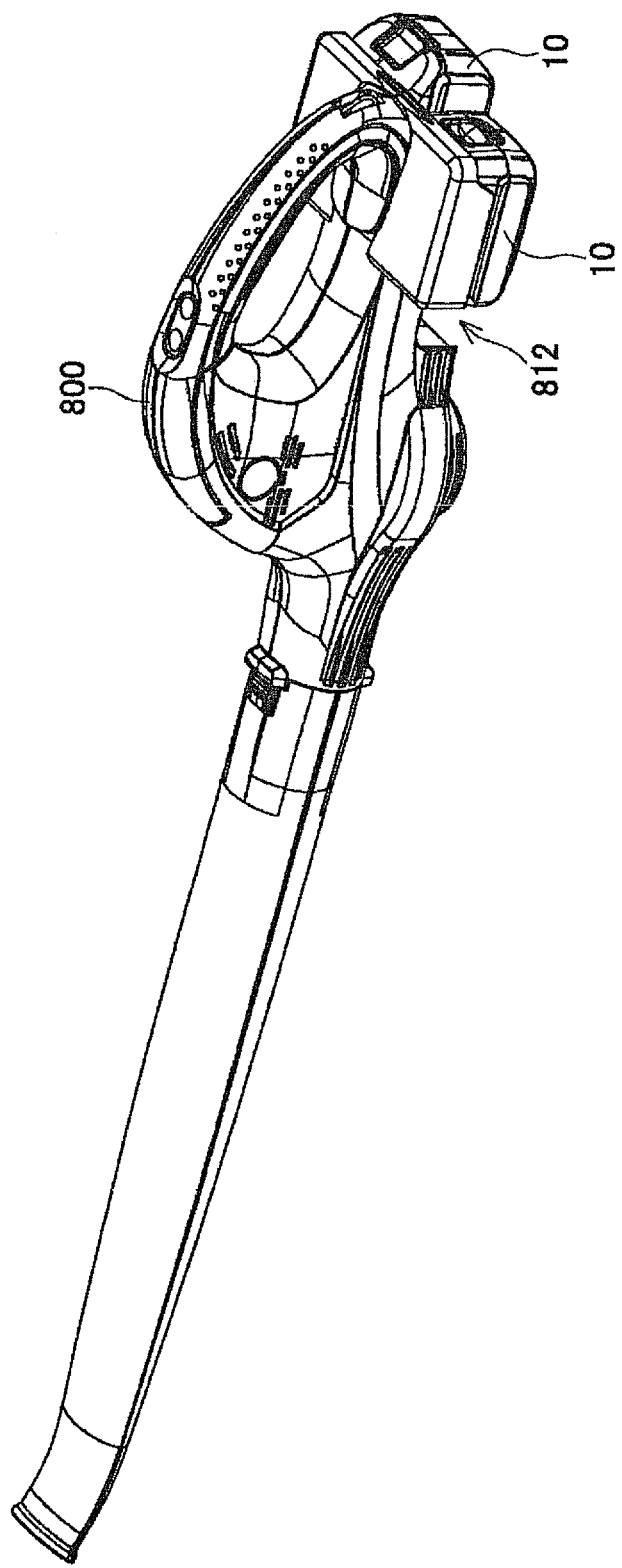
FIG. 24 is an external view of an electric power tool of Eighth Embodiment.

The adapter 700 encloses a microcomputer and a battery connector circuit. A battery pack 10 attached to the adapter 700 is electrically connected to the second electric power tool 50b via the battery connector circuit. As FIG. 24 illustrates, the battery connector circuit is a circuit to connect two battery interfaces 712 in parallel. The adapter 700 of this example connects one or a plurality of battery packs 10 of which nominal voltage is 18 V to the second electric power tool 50b of which rated voltage is 18 V. Therefore the battery connector circuit connects all the attached battery packs 10 in parallel, so that the supply voltage from the battery pack 10 to the second electric power tool 50b becomes a level corresponding to the rated voltage of the second electric power tool 50b (that is, 18 V).

The battery connector circuit has a pair of switching elements and a diode for each battery interface 712. These switching elements are controlled by the microcomputer. The microcomputer normally turns each switching element OFF, and turns a corresponding pair of switching element ON only for a battery interface 712 that has received a battery pack 10. As a result, a battery interface 712 that has not received a battery pack 10 is electrically disconnected from a battery interface 712 that has received the battery pack 10. Thereby it is prevented that DC voltage from a battery pack 10 is applied to a terminal exposed in a battery interface 712.

As described above, the adapter 700 of this example is provided with the battery connector circuit, whereby power can be supplied from a plurality of battery packs 10 to the second electric power tool 50b. As a result, the user can continuously use the second electric power tool 50b for a long period of time. According to this adapter 700, the user can use the second electric power tool 50b for a dramatically longer period of time using a plurality of already owned small capacity battery packs 10, without purchasing a new large capacity battery pack.

Eighth Embodiment

Figure 25:
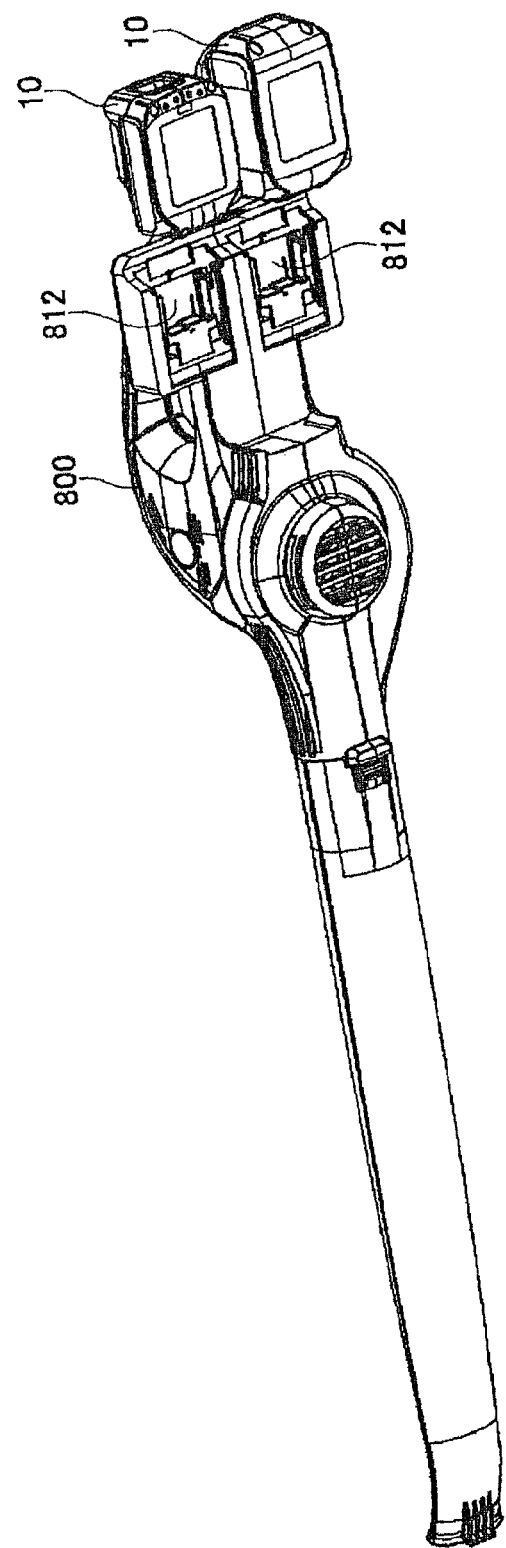
FIG. 25 is an external view of an electric power tool of Eighth Embodiment.

An electric power tool 800 of Eighth Embodiment will now be described with reference to the drawings. FIG. 24 and FIG. 25 are external views of the electric power tool 800, and FIG. 27 is a schematic diagram of a circuit structure of the electric power tool 800. As FIG. 24 to FIG. 27 illustrate, the electric power tool 800 is an electric power tool powered by a maximum of two battery packs 10. The electric power tool 800 illustrated in FIG. 24 and FIG. 25 is an electric blower where a fan is driven by a motor 854, but the electric power tool 800 of this example is not limited to the electric blower.

The electric power tool 800 has two battery interfaces 812. Each battery interface 812 removably receives one battery pack 10. Therefore a maximum of two battery packs 10 can be attached to the electric power tool 800. Each battery interface 812 mechanically and electrically connects the attached battery pack 10. Each battery pack 10 is the same as that described in First Embodiment, and encloses a plurality of battery cells 12 and a storage device 14.

Each battery interface 812 can alternatively receive a battery pack 10 of which nominal voltage is 14.4 V and a battery pack 10 of which nominal voltage is 18 V. In the example in FIG. 24 to FIG. 26, one battery pack 10 of which nominal voltage is 14.4 V and one battery pack 10 of which nominal voltage is 18 V are attached to the electric power tool 800. To the electric power tool 800, two battery packs 10 need not always be attached, but at least one battery pack 10 can be attached.

Figure 26:
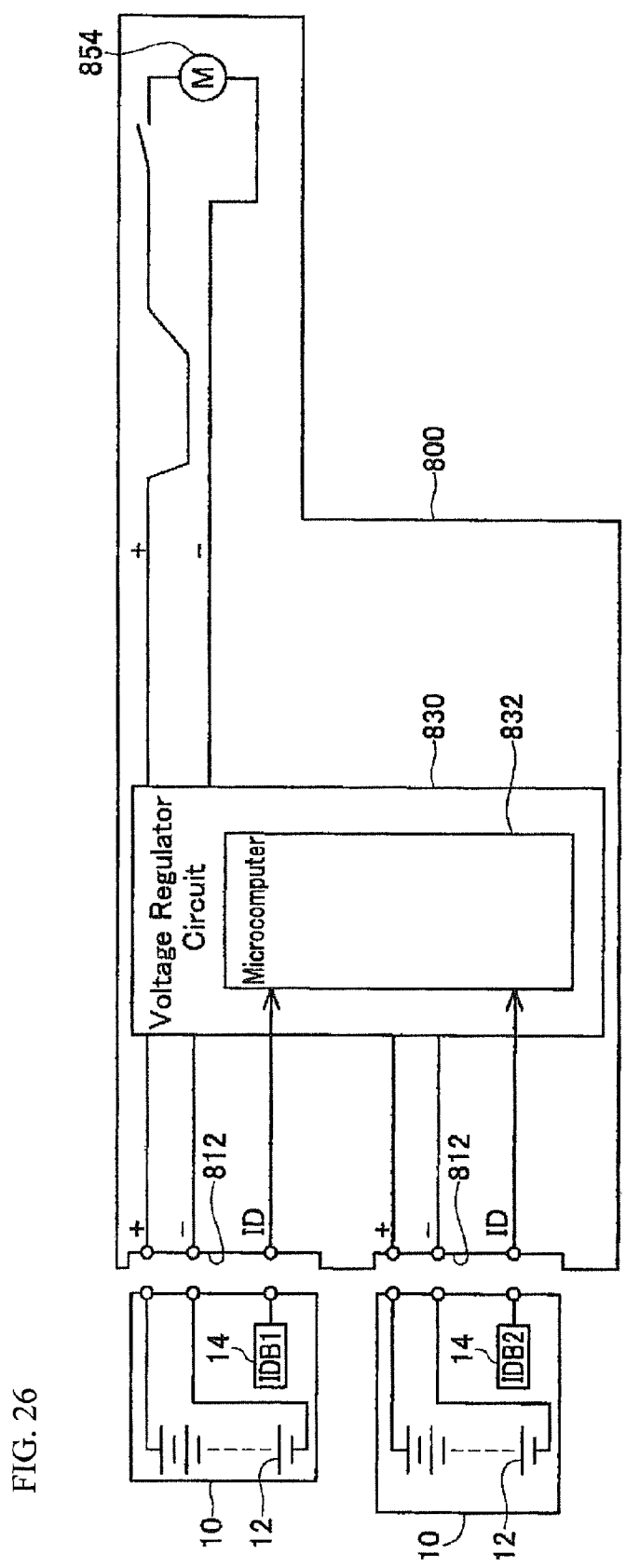
FIG. 26 is a schematic diagram depicting a circuit structure of the electric power tool of Eighth Embodiment.
Figure 27:
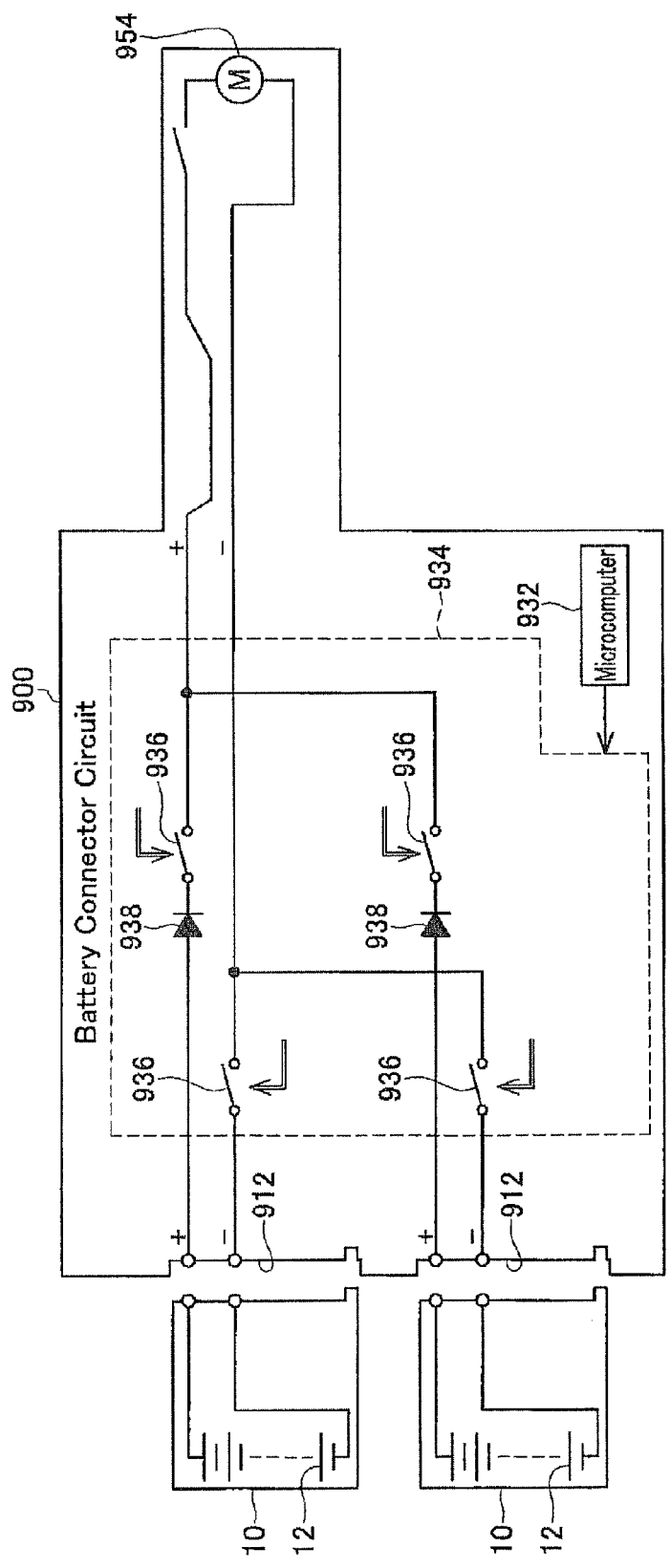
FIG. 27 is a schematic diagram depicting a circuit structure of an electric power tool of Ninth Embodiment.

As FIG. 26 illustrates, the electric power tool 800 is provided with a motor 854 and a voltage regulator circuit 830. The motor 854 is a motor to drive a fan (not illustrated), and a rated voltage thereof is 36 V. In the electric power tool 800, two battery interfaces 812 are electrically connected to the motor 854 via the voltage regulator circuit 830. This means that the power from the battery pack 10 is supplied to the motor 854 via the voltage regulator circuit 830. The voltage regulator circuit 830 is a circuit for transforming DC voltage. The voltage regulator circuit 830 can regulate the supply voltage from the battery pack 10 to the motor 854 to a level corresponding to the rated voltage of the motor 854 (that is, 36 V), regardless of the nominal voltage of the battery pack 10.

The voltage regulator circuit 830 is provided with a microcomputer 832, and the microcomputer 832 controls the operation of the voltage regulator circuit 830. If a battery pack 10 is attached to the battery interface 812, the microcomputer 832 is electrically connected to the storage device 14 of the battery pack 10. The microcomputer 832 accesses the storage device 14 of the battery pack 10, and reads the product information stored therein. As a result, the microcomputer 832 switches a mode of operation of the voltage regulator circuit 830 according to the obtained product information. Thereby a predetermined voltage can be supplied to the motor 854, regardless of the nominal voltage of the battery pack 10.

As described above, the electric power tool 800 of this example is provided with the voltage regulator circuit 830, whereby the supply voltage to the motor 854 can be regulated to a level corresponding to the rated voltage thereof (that is, 36 V), regardless of the nominal voltage of the battery pack 10. As a result, the user can use the electric power tool 800 of which rated voltage is 36 V using battery packs 10 of which nominal voltages are 14.4 V and 18 V. Therefore the user need not always prepare a battery pack of which nominal voltage is 36 V to use the electric power tool 800. Already owned low voltage battery packs 10 can be effectively used for the electric power tool 800.

The voltage regulator circuit 830 of this example can be configured in the same way as the voltage regulator circuit 130 described in First Embodiment (see FIG. 3, FIG. 4 and FIG. 5). For example, the voltage regulator circuit 830 of this example can be configured using at least either the step-up/down converter to transform DC voltage from a battery pack 10, or a battery connector circuit to switch a mode of connection of two battery packs 10.

Ninth Embodiment

The electric power tool 900 of Ninth Embodiment will now be described with reference to the drawings. FIG. 27 is a schematic diagram of a circuit structure of the electric power tool 900. As FIG. 27 illustrates, the electric power tool 900 is an electric power tool powered by a maximum of two battery packs 10.

The electric power tool 900 has two battery interfaces 912. Each battery interface 912 removably receives one battery pack 10. This means that a maximum of two battery packs 10 can be attached to the electric power tool 900. Each battery interface 912 mechanically and electrically connects the attached battery packs 10. Each battery pack 10 encloses at least a plurality of battery cells 12.

Each battery interface 912 is designed exclusively for a battery pack 10 of which nominal voltage is 18 V. This means that each battery interface 912 is configured to removably receive a battery pack 10 of which nominal voltage is 18 V, but not to receive a battery pack of which nominal voltage is not 18 V. As a result, it is prevented that a battery pack of which nominal voltage is not 18 V is attached to the electric power tool 900. Thus two battery packs 10 need not always be attached to the electric power tool 900, but at least one battery pack 10 can be attached.

The electric power tool 900 is provided with a microcomputer 932, a battery connector circuit 934 and a motor 954. The rated voltage of the motor 954 is 18 V. In the electric power tool 900, two battery interfaces 912 are electrically connected to the motor 954 via the battery connector circuit 934. This means that power from the battery pack 10 is supplied to the motor 954 via the battery connector circuit 934. The battery connector circuit 934 is a circuit to connect the two battery interfaces 912 in parallel. The electric power tool 900 of this example drives the motor 954 of which rated voltage is 18 V using one or a plurality of battery packs 10 of which nominal voltage is 18 V. Therefore the battery connector circuit 934 connects all the attached battery packs 10 in parallel, so that the supply voltage from the battery pack 10 to the motor 954 becomes a level corresponding to the rated voltage of the motor 954 (that is, 18 V).

The battery connector circuit 934 has a pair of switching elements 936 and a diode 938 for each battery interface 912. Each switching element 936 is controlled by the microcomputer 932. The configuration and operation of the battery connector circuit 934 are the same as those of the battery connector circuit 734 described in Seventh Embodiment (see FIG. 24), hence description thereof is omitted here.

As described above, the electric power tool 900 of this example is provided with the battery connector circuit 934, whereby the motor 954 can be driven by a plurality of battery packs 10. As a result, the user can continuously use the electric power tool 900 for a long period of time. According to this electric power tool 900, the user can operate the electric power tool 900 for a longer time using a plurality of already owned small capacity battery packs 10, without purchasing a new large capacity battery pack.

Specific embodiments of the present teachings is described above, but that merely illustrates some possibilities of the teachings and does not restrict the claims thereof. The art set forth in the claims includes variations and modifications of the specific examples set forth above.

The technical elements disclosed in the specification or the drawings may be utilized separately or in all types of combinations, and are not limited to the combinations set forth in the claims at the time of filing of the application. Furthermore, the art disclosed herein may be utilized to simultaneously achieve a plurality of aims or to achieve one of these aims.

The invention claimed is:

1. An adapter for coupling at least one battery pack with an electric power tool, the adapter comprising:
   a battery-side unit configured to attach the at least one battery pack and be electrically connected to the at least one battery pack that is attached;
   at least two tool-side units configured to attach the electric power tool and be electrically connected to the attached electric power tool; and
   a voltage regulator circuit configured to be interposed between the at least one battery pack attached to the battery-side unit and the electric power tool attached to the tool-side unit, and regulate a supply voltage from the at least one battery pack to the electric power tool to a level corresponding to a rated voltage of the electric power tool,
   wherein:
   the at least two tool-side units include a first tool-side unit and a second tool-side unit;
   the first tool-side unit and the second tool-side unit are configured to be alternatively attachable to the battery-side unit;
   the first tool-side unit is configured to be attachable to an electric power tool having a first rated voltage and not to be attachable to an electric power tool having a second rated voltage;
   the second tool-side unit is configured to be attachable to the electric power tool having the second rated voltage and not to be attachable to the electric power tool having the first rated voltage; and
   the voltage regulator circuit is configured to regulate the supply power to a level being substantially equal to the first rated voltage when the battery-side unit is attached to the first tool-side unit, and regulate the supply power to a level being substantially equal to the second rated voltage when the battery-side unit is attached to the second tool-side unit;
   each tool-side unit is provided with storing means configured to store data by which an identification can be made from the other tool-side unit; and
   the voltage regulator circuit is configured to read the data from the storing means of the tool-side unit to identify the tool-side unit attached to the battery-side unit.

2. The adapter as in claim 1, wherein the voltage regulator circuit is configured to cause the supply voltage from the at least one battery pack to be higher than any nominal voltage of the at least one battery pack.

3. The adapter as in claim 1, wherein the voltage regulator circuit comprises means for detecting a nominal voltage of each battery pack, and is configured to change a mode of operation according to the respective nominal voltage that is detected.

4. The adapter as in claim 3, wherein the at least one battery pack each comprises storing means for storing data indicative of the nominal voltage, and the voltage regulator circuit is configured to read the data from the storing means of each battery pack to detect the nominal voltage of each battery pack.

5. The adapter as in claim 1, wherein the voltage regulator circuit comprises means for detecting a number of battery packs attached to the battery-side unit, and is configured to change a mode of operation according to the detected number of battery packs.

6. The adapter as in claim 1, wherein:
   the battery-side unit comprises a plurality of battery interfaces configured to detachably receive battery packs; and
   the voltage regulator circuit is configured to electrically connect battery interfaces that have received the battery packs to one another, and disconnect a battery interface that has not received a battery pack from the battery interfaces that have received the battery packs.

7. The adapter as in claim 1, wherein the battery-side unit and the tool-side unit are electrically connected to each other via an electric cord.

8. An adapter for coupling at least one battery pack with an electric power tool, the adapter comprising:
   a battery-side unit configured to attach the at least one battery pack and be electrically connected to the at least one battery pack that is attached;
   at least two tool-side units each configured to attach the electric power tool and be electrically connected to the attached electric power tool; and a voltage regulator circuit configured to be interposed between the at least one battery pack attached to the battery-side unit and the electric power tool attached to the tool-side unit, and regulate a supply voltage from the at least one battery pack to the electric power tool to a level corresponding to a rated voltage of the electric power tool, wherein:

the at least two tool-side units include a first tool-side unit and a second tool-side unit;

the first tool-side unit comprises a first electric cord having a tip end coupled with the first tool-side unit;

the second tool-side unit comprises a second electric cord having a tip end coupled with the second tool-side unit;

the battery-side unit comprises a first cord connection for a base end of the first electric cord, and a second cord connection for connecting for a base end of the second electric cord;

the first tool-side unit is configured to be attachable to an electric power tool having a first rated voltage and not to be attachable to an electric power tool having a second rated voltage;

the second tool-side unit is configured to be attachable to the electric power tool having the second rated voltage and not to be attachable to the electric power tool having the first rated voltage;

the base ends of the first and second electric cords have shapes different from one another;

the first cord connection is configured to accept the base end of the first electric cord, and not to accept the base end of the second electric cord;

the second cord connection is configured to accept the base end of the second electric cord, and not to accept the base end of the first electric cord; and the voltage regulator circuit is configured to output a voltage regulated to a level being substantially equal to the first rated voltage from the first cord connection, and output a voltage regulated to a level being substantially equal to the second rated voltage from the second cord connection.

9. The adapter as in claim 8, wherein the voltage regulator circuit is configured to cause the supply voltage from the at least one battery pack to be higher than any nominal voltage of the at least one battery pack.

10. The adapter as in claim 8, wherein the voltage regulator circuit comprises means for detecting a nominal voltage of each battery pack, and is configured to change a mode of operation according to the respective nominal voltage that is detected.

11. The adapter as in claim 10, wherein the at least one battery pack each comprises storing means for storing data indicative of the nominal voltage, and the voltage regulator circuit is configured to read the data from the storing means of each battery pack to detect the nominal voltage of each battery pack.

12. The adapter as in claim 8, wherein the voltage regulator circuit comprises means for detecting a number of battery packs attached to the battery-side unit, and is configured to change a mode of operation according to the detected number of battery packs.

13. The adapter as in claim 8, wherein:

the battery-side unit comprises a plurality of battery interfaces configured to detachably receive battery packs; and the voltage regulator circuit is configured to electrically connect battery interfaces that have received the battery packs to one another, and disconnect a battery interface that has not received a battery pack from the battery interfaces that have received the battery packs.

* * * * *